(12) United States Patent
Tsuda et al.

(10) Patent No.: US 9,216,734 B2
(45) Date of Patent: Dec. 22, 2015

(54) CONTROL DEVICE

(71) Applicant: AISIN AW CO., LTD., Anjo-shi, Aichi-ken (JP)

(72) Inventors: Kohei Tsuda, Nishio (JP); Tomohiro Onouchi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/362,560

(22) PCT Filed: Feb. 22, 2013

(86) PCT No.: PCT/JP2013/054573
§ 371 (c)(1),
(2) Date: Jun. 3, 2014

(87) PCT Pub. No.: WO2013/125693
PCT Pub. Date: Aug. 29, 2013

(65) Prior Publication Data
US 2014/0330474 A1    Nov. 6, 2014

(30) Foreign Application Priority Data
Feb. 24, 2012   (JP) ................................. 2012-039082

(51) Int. Cl.
*B60W 20/00* (2006.01)
*B60K 6/485* (2007.10)
(Continued)

(52) U.S. Cl.
CPC ................ *B60W 20/10* (2013.01); *B60K 6/485* (2013.01); *B60K 6/547* (2013.01); *B60W 10/08* (2013.01); *B60W 10/115* (2013.01); *B60W 20/00* (2013.01); *B60W 30/19* (2013.01); *B60W 2510/08* (2013.01); *F16H 2061/0433* (2013.01); *Y02T 10/6226* (2013.01); *Y02T 10/6286* (2013.01); *Y10S 903/902* (2013.01)

(58) Field of Classification Search
CPC ... B60W 20/10; B60W 10/08; B60W 10/115; B60W 20/00; B60W 30/19; B60K 6/485; B60K 6/547; Y10S 903/902
USPC .......................................................... 701/22
See application file for complete search history.

(56) References Cited

U.S. PATENT DOCUMENTS 8,348,795 B2 *    1/2013   Kumazaki et al. ................. 475/5
2008/0182710 A1 *  7/2008  Shibata et al. ..................... 477/3
(Continued)

FOREIGN PATENT DOCUMENTS

JP    A-10-304514    11/1998
JP    A-2000-152407   5/2000
(Continued)

*Primary Examiner* — Mary Cheung
*Assistant Examiner* — Michael Berns
(74) *Attorney, Agent, or Firm* — Oliff PLC

(57) ABSTRACT

A control device for a vehicle. A shift assist control section executes shift assist control of increasing a rotational speed of an input-side rotating member of the speed change mechanism. A possibility determining section that determines whether or not the rotating electrical machine can output required input torque. A mode selecting section that selects one shift mode from a first shift mode and a second shift mode that is different from the first shift mode in at least one of a condition for starting the downshift and processing. A torque compensating section that, if it is determined that the rotating electrical machine cannot output the required input torque, compensates for a shortfall in the required input torque in the shift assist control by using at least one of output torque of the internal combustion engine and torque that is transferred by the shift engagement device according to the shift mode.

8 Claims, 11 Drawing Sheets

(51) Int. Cl.
*B60K 6/547* (2007.10)
*B60W 10/08* (2006.01)
*B60W 10/115* (2012.01)
*B60W 30/19* (2012.01)
*F16H 61/04* (2006.01)

(56) References Cited

U.S. PATENT DOCUMENTS

2010/0087287 A1\* 4/2010 Tabata et al. .................. 477/3
2011/0021311 A1\* 1/2011 Kim et al. .................... 477/3
2011/0087390 A1\* 4/2011 Pandit et al. ................. 701/22
2011/0087391 A1\* 4/2011 Pandit et al. ................. 701/22
2011/0087392 A1\* 4/2011 Kshatriya .................... 701/22
2012/0004064 A1 1/2012 Kumazaki et al.
2012/0108384 A1\* 5/2012 Tabata et al. .................. 477/3

FOREIGN PATENT DOCUMENTS

JP  A-2004-316831  11/2004
JP  A-2010-215040  9/2010

\* cited by examiner

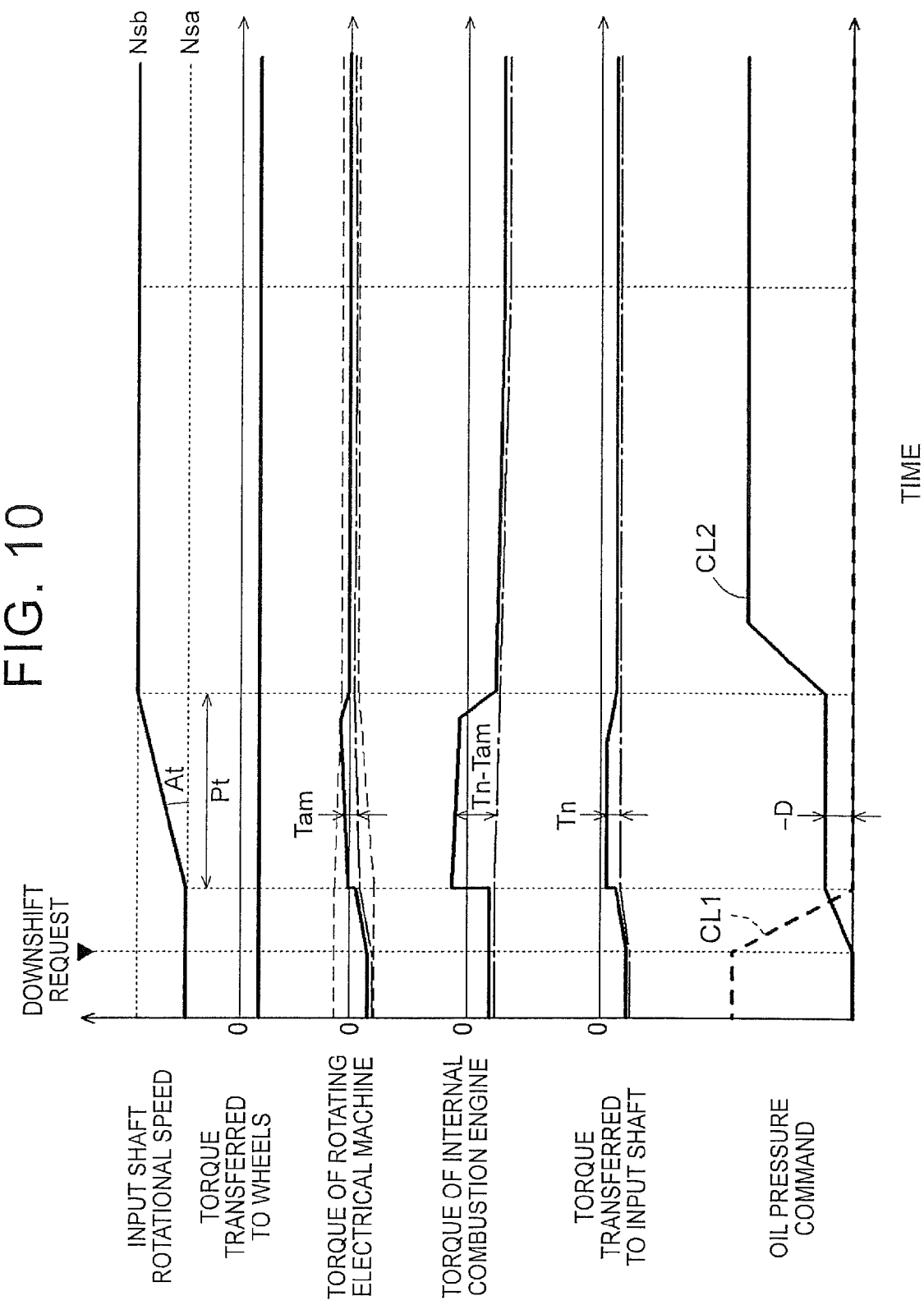

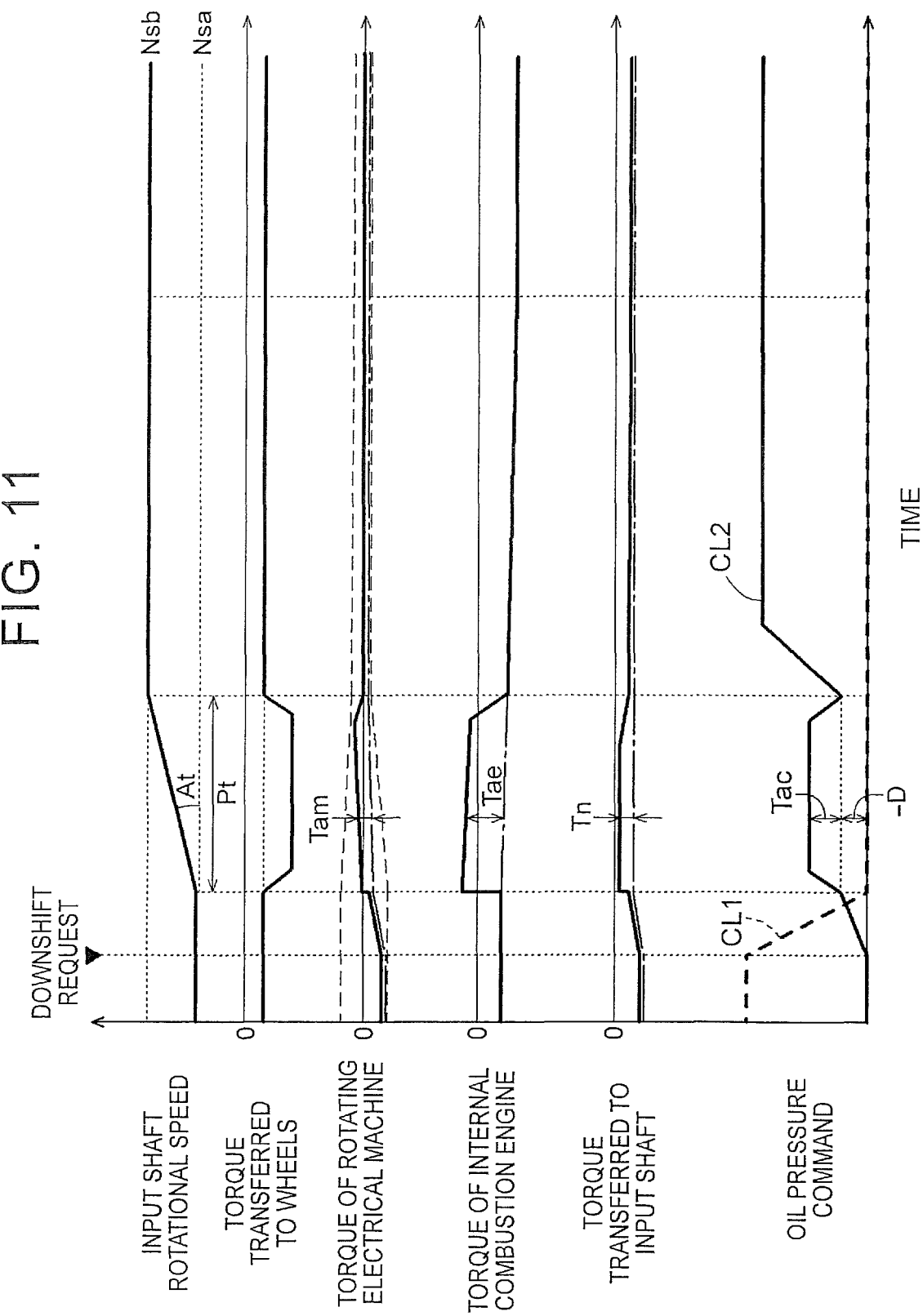

CONTROL DEVICE

TECHNICAL FIELD

The present invention relates to control devices that control a vehicle drive device in which a rotating electrical machine and a speed change mechanism are provided in this order from the internal combustion engine side on a power transmission path connecting the internal combustion engine and wheels.

BACKGROUND ART

A device described in Japanese Patent Application Publication No. 2004-316831 (JP 2004-316831 A) (Patent Document 1) is already known as a control device that controls such a vehicle drive device as described above. The terms or expressions in Patent Document 1 are cited in parentheses "[ ]" in the description of this section "BACKGROUND ART." This control device causes the rotating electrical machine [motor-generator 2] to add or absorb torque according to the combination of the direction in which the speed ratio is changed [upshift or downshift] and the operating state of the internal combustion engine [whether the engine power is on or the engine power is off] during shift operation. For example, in order to perform downshift when the engine power is off, the control device increases the rotational speed of an input-side rotating member [transmission input shaft 5] of the speed change mechanism [stepped automatic transmission 3] by increasing torque of the rotating electrical machine which is transferred to the input-side rotating member. Responsive shift control can thus be performed while reducing shift shock.

In the control device of Patent Document 1, however, a primary component that increases the rotational speed of the input-side rotating member for shift assist during the shift control for downshift is limited to the rotating electrical machine. Accordingly, sufficient torque required may not be output depending on the situation where the rotating electrical machine is in. As a result, intended control may not be appropriately performed, and sufficient reduction in shift shock may not be achieved.

RELATED ART DOCUMENT

Patent Document

[Patent Document 1] Japanese Patent Application Publication No. 2004-316831 (JP 2004-316831 A)

SUMMARY OF THE INVENTION

Problem to be Solved by the Invention

It is therefore desired to implement a control device capable of performing appropriate responsive downshift even in situations where there is not enough of the torque of a rotating electrical machine.

Means for Solving the Problem

According to the present invention, a control device for a vehicle drive device in which a rotating electrical machine and a speed change mechanism are provided in this order from an internal combustion engine side on a power transmission path connecting the internal combustion engine and wheels, and in which the speed change mechanism is capable of changing a speed ratio by controlling an engagement state of a shift engagement device included in the speed change mechanism is characterized by including: a shift assist control section that, in downshift in which the speed ratio is changed to a higher speed ratio, executes shift assist control of increasing a rotational speed of an input-side rotating member of the speed change mechanism by increasing torque of the rotating electrical machine which is transferred to the input-side rotating member; a possibility determining section that determines whether or not the rotating electrical machine can output required input torque for increasing the rotational speed of the input-side rotating member according to a predetermined target rotational speed change rate; a mode selecting section that selects one shift mode from a first shift mode and a second shift mode that is different from the first shift mode in at least one of a condition for starting the downshift and processing; and a torque compensating section that, if it is determined that the rotating electrical machine cannot output the required input torque, compensates for a shortfall in the required input torque in the shift assist control by using at least one of output torque of the internal combustion engine and torque that is transferred by the shift engagement device according to the shift mode.

According to this characteristic configuration, the rotational speed of the input-side rotating member can be increased according to the target rotational speed change rate by the shift assist control at least in the case where the rotating electrical machine can output the required input torque. Responsive shift control can thus be executed. Even if the rotating electrical machine cannot output the required input torque, at least one of the internal combustion engine and the shift engagement device can be made to compensate for the shortfall in the required input torque. At this time, the primary component that compensates for the shortfall in the required input torque is not always the same, but is variably decided according to the shift mode. That is, the torque that compensates for the shortfall in the required input torque is variably decided according to the shift mode from the output torque of the internal combustion engine and the torque that is transferred by the shift engagement device. Accordingly, the shortfall in the required input torque can be appropriately compensated for according to respective control characteristics of the first shift mode and the second shift mode that are different from each other in at least one of the condition for starting the downshift and the processing. A control device can thus be implemented which is capable of performing appropriate responsive downshift even in situations where there is not enough of the torque of the rotating electrical machine.

It is preferable that the first shift mode be an automatic shift mode, and the second shift mode be a manual shift mode, or the second shift mode be a mode in which time required for control for the downshift is shorter than that in the first shift mode or a mode in which acceleration response in the downshift is higher than that in the first shift mode, and the torque compensating section compensate for the shortfall by using the torque that is transferred by the shift engagement device when the first shift mode is selected, and compensate for the shortfall by using at least the output torque of the internal combustion engine when the second shift mode is selected.

In the above configuration, when the second shift mode is implemented, quick execution of the shift control or a good driving feeling tends to be more prioritized over fuel efficiency during traveling of the vehicle than when the first shift mode is implemented. Accordingly, when the second shift mode is selected, the shortfall in the required input torque is compensated for by using the output torque of the internal combustion engine. This allows the shift control to be quickly executed in a short time while suppressing shift shock. On the other hand, when the first shift mode is selected, the shortfall in the required input torque is compensated for by using the torque that is transferred by the shift engagement device. This allows responsive downshift to be performed while suppressing reduction in fuel efficiency.

It is preferable that the possibility determining section further determine whether or not the rotating electrical machine and the internal combustion engine can cooperatively output the required input torque, and the torque compensating section compensate for the shortfall by further using the torque that is transferred by the shift engagement device, if it is determined that the required input torque cannot be output even by the cooperation between the rotating electrical machine and the internal combustion engine when the second shift mode is selected.

According to this configuration, when the second shift mode is selected, the shortfall in the required input torque is compensated for by further using, under the above specific condition, the torque that is transferred by the shift engagement device. The rotational speed of the input-side rotating member can therefore be increased by the cooperation among the rotating electrical machine, the internal combustion engine, and the shift engagement device. This allows responsive downshift to be performed even when the required input torque cannot be output by the cooperation between the rotating electrical machine and the internal combustion engine.

It is preferable that the possibility determining section further determine whether or not the rotating electrical machine can output lower limit input torque for increasing the rotational speed of the input-side rotating member according to a predetermined lower limit rotational speed change rate, and the torque compensating section compensate for the shortfall by using the torque that is transferred by the shift engagement device, on condition that it is determined that the rotating electrical machine cannot output the lower limit input torque when the first shift mode is selected.

The torque that is transferred to the wheels can fluctuate when the shortfall in the required input torque is compensated for by the shift engagement device. In view of this, according to the above configuration, the shortfall in the required input torque is compensated for by using the torque that is transferred by the shift engagement device, only if the rotating electrical machine cannot output the lower limit input torque. This can minimize a chance for the torque that is transferred to the wheels to fluctuate. On the other hand, if the rotating electrical machine can output the lower limit input torque, the rotational speed of the input-side rotating member can be increased according to the lower limit rotational speed change rate by the shift assist control using the lower limit input toque. Relatively responsive shift control can thus be executed while suppressing torque fluctuations.

It is preferable that the rotational speed of the input-side rotating member which is determined according to a vehicle speed and the speed ratio be a synchronous rotational speed, and the lower limit rotational speed change rate be set based on a difference between synchronous rotational speeds before and after changing the speed ratio, and upper limit shift time determined so that a heat generation amount of the shift engagement device that is caused to slip when the speed ratio is changed is equal to or smaller than a predetermined acceptable heat generation amount.

According to this configuration, relatively responsive shift control can be executed, and the heat generation amount of the shift engagement device can be suppressed to the acceptable heat generation amount or less. This can suppress thermal degradation of the shift engagement device, or can reduce the need to improve heat resistance of the shift engagement device or to include a dedicated cooling mechanism and can suppress an increase in manufacturing cost of the drive device to be controlled.

It is preferable that the above control that allows appropriate responsive downshift to be performed even in the situations where there is not enough of the torque of the rotating electrical machine be applied in power-off downshift. That is, it is preferable that the torque compensating section execute control of compensating for the shortfall during execution of the shift assist control in the power-off downshift if it is determined that the rotating electrical machine cannot output the required input torque.

BRIEF DESCRIPTION OF THE DRAWINGS

FIG. 10 is a timing chart showing an example of the operating state of each part during shift assist control.

FIG. 11 is a timing chart showing an example of the operating state of each part during shift assist control.

MODES FOR CARRYING OUT THE INVENTION

Figure 1:
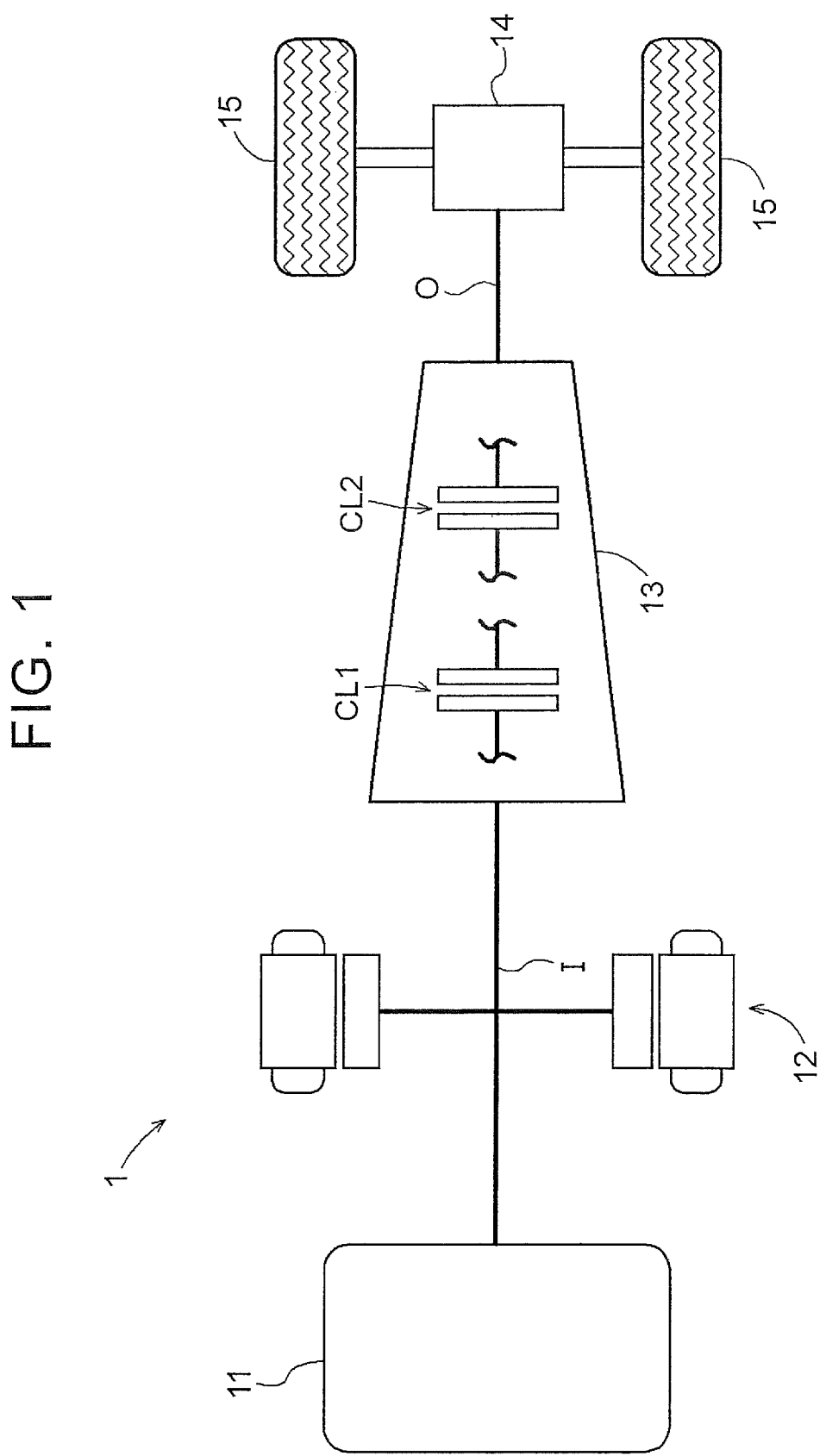
FIG. 1 is a schematic diagram showing a general configuration of a vehicle drive device.

An embodiment of a control device according to the present invention will be described with reference to the accompanying drawings. A control device 3 according to the present embodiment controls a drive device 1. The drive device 1 is a vehicle drive device (hybrid vehicle drive device) that drives a vehicle (hybrid vehicle) including both an internal combustion engine 11 and a rotating electrical machine 12 as driving force sources of wheels 15. The control device 3 according to the present embodiment will be described in detail below.

1. Configuration of Drive Device

The configuration of the drive device 1 that is controlled by the control device 3 will be described. As shown in FIG. 1, the drive device 1 according to the present embodiment includes the rotating electrical machine 12 on a power transmission path connecting the internal combustion engine 11 and the wheels 15, and includes a speed change mechanism 13 between the rotating electrical machine 12 and the wheels 15. That is, the drive device 1 includes the rotating electrical machine 12 and the speed change mechanism 13 in this order from the internal combustion engine 11 side on the power transmission path connecting the internal combustion engine 11 and the wheels 15. These components are accommodated in a drive device case (not shown).

The internal combustion engine 11 is a motor (gasoline engine etc.) that is driven by fuel combustion in the engine to output power. The internal combustion engine 11 is drivingly coupled to an input shaft I serving as an input member of the drive device 1. In this example, an internal-combustion-engine output shaft such as a crankshaft of the internal combustion engine 11 is drivingly coupled to the input shaft I so as to rotate together therewith. The internal combustion engine 11 is drivingly coupled to the rotating electrical machine 12 via the input shaft I. The expression "drivingly coupled" means the state where two rotating members are coupled together so as to be able to transmit a driving force (synonymous with "torque") therebetween. This concept includes the state where the two rotating members are coupled together so as to rotate together, the state where the two rotating members are coupled together so as to be able to transmit a driving force therebetween via one or more transmission members (a shaft, a gear mechanism, a belt, etc.), etc.

The rotating electrical machine 12 has a rotor and a stator, and is capable of functioning both as a motor (electric motor) and as a generator (electric generator). The rotor of the rotating electrical machine 12 is drivingly coupled to the input shaft I so as to rotate together therewith. The rotating electrical machine 12 is electrically connected to an electricity storage device 25 (a battery, a capacitor, etc.) via an inverter device 24 (see FIG. 2). The rotating electrical machine 12 is supplied with electric power from the electricity storage device 25 to perform power running, or supplies electric power generated by torque of the internal combustion engine 11, etc. to the electricity storage device 25 to store the electric power therein. The input shaft I is a rotating member (input member of the speed change mechanism 13) drivingly coupled to the speed change mechanism 13 and located closest to the internal combustion engine 11 along the power transmission path in the speed change mechanism 13. In the present embodiment, the input shaft I corresponds to the "input-side rotating member" in the present invention.

In the present embodiment, the speed change mechanism 13 is an automatic stepped speed change mechanism having a plurality of switchable shift speeds with different speed ratios (gear ratios). In order to form the plurality of shift speeds, the speed change mechanism 13 includes a gear mechanism and a plurality of engagement devices (shift engagement devices) that engage or disengage rotating elements of the gear mechanism. Each of these engagement devices is configured as a friction engagement device capable of transferring torque by a friction force that is generated between engagement members engaged with each other. Wet multi-plate clutches (including brakes) etc. can be used as these engagement devices. The engagement devices of the speed change mechanism 13 include a first engagement device CL1, a second engagement device CL2, . . . . In the present embodiment, the speed change mechanism 13 forms a target shift speed at each point of time by bringing specific two of the plurality of engagement devices into a direct-coupling engaged state and bringing the remainder into a disengaged state. The speed change mechanism 13 may form a target shift speed by bringing a specific one or specific three or more of the plurality of engagement devices into the direct-coupling engaged state. The speed change mechanism 13 is thus capable of switching between or among the plurality of shift speeds (capable of changing the speed ratio) by controlling the engagement state of each of the plurality of shift engagement devices.

The speed change mechanism 13 shifts the rotational speed of the input shaft I based on the speed ratio that has been set for the shift speed to be formed, and transmits the shifted rotational speed to an output shaft O. As used herein, the "speed ratio" is a ratio of the rotational speed of the input shaft I to the rotational speed of the output shaft O serving as an output-side rotating member of the speed change mechanism 13. The output shaft O that also serves as an output member of the drive device 1 is drivingly coupled to the right and left two wheels 15 via a differential gear unit 14. Torque transferred to the output shaft O is distributed and transferred to the two wheels 15 by the differential gear unit 14. The drive device 1 can thus transfer the torque of one or both of the internal combustion engine 11 and the rotating electrical machine 12 to the wheels 15 to move the vehicle.

2. Configuration of Control Device

Figure 2:
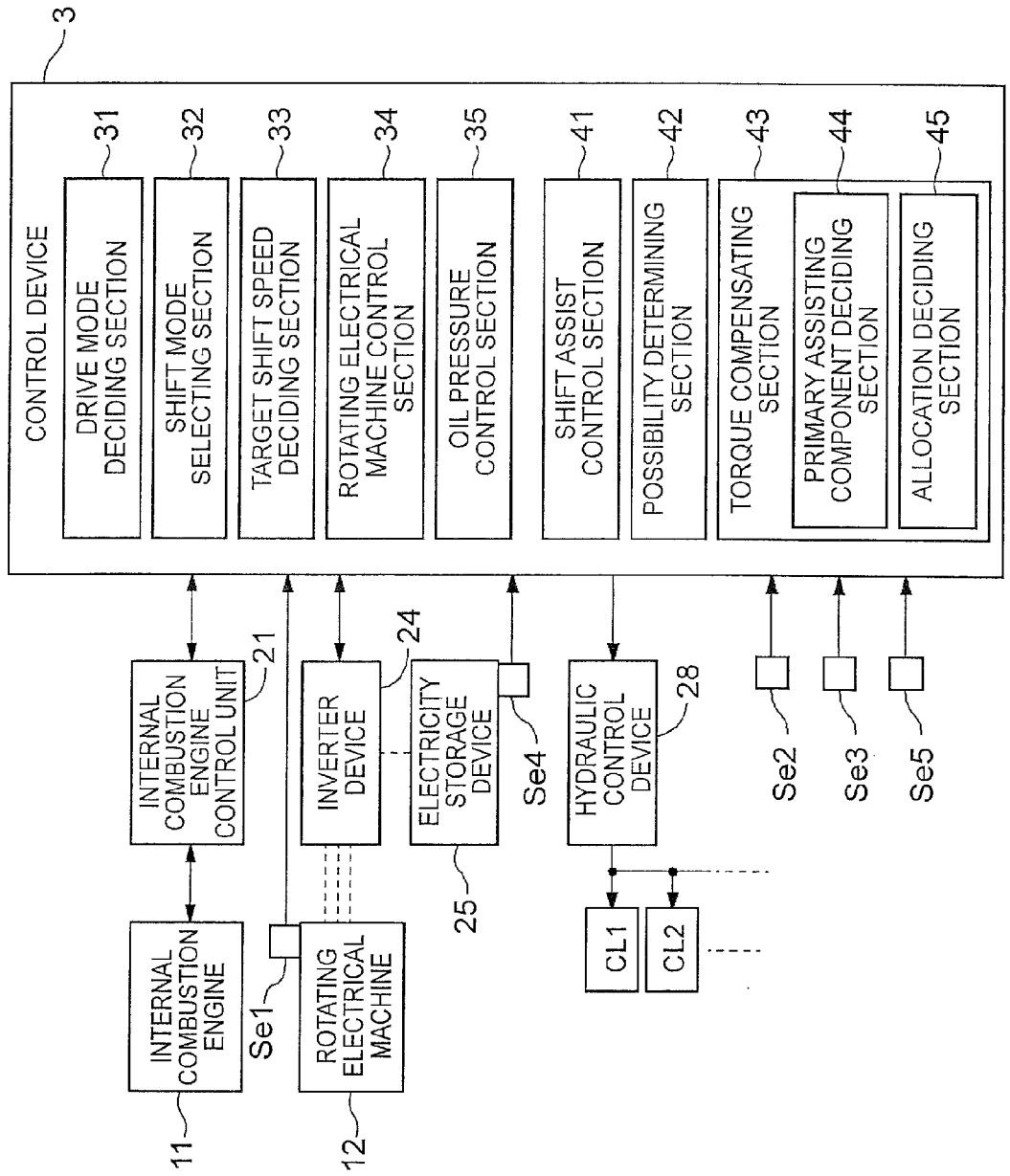
FIG. 2 is a block diagram showing a general configuration of a control device.

The configuration of the control device 3 according to the present embodiment will be described. As shown in FIG. 2, the control device 3 according to the present embodiment includes a plurality of function units, and mainly controls the rotating electrical machine 12 and the shift engagement devices (CL1, CL2, . . . ). The plurality of function units are capable of receiving and sending information from and to each other. The control device 3 is also capable of receiving and sending information from and to an internal combustion engine control unit 21 that controls the internal combustion engine 11. The control device 3 is capable of obtaining information on the detection results of sensors Se1 to Se5 provided in each part of the vehicle.

The first rotation sensor Se1 is a sensor that detects the rotational speed of the input shaft I (the internal combustion engine 11 and the rotating electrical machine 12). The second rotation sensor Se2 is a sensor that detects the rotational speed of the output shaft O. The control device 3 is capable of deriving the rotational speed of the wheels 15 and the vehicle speed based on the detection result of the second rotation sensor Se2. The accelerator operation amount detection sensor Se3 is a sensor that detects the accelerator operation amount. The state-of-charge detection sensor Se4 is a sensor that detects the state of charge (SOC). The control device 3 is capable of deriving the amount of electricity stored in the electricity storage device 25 based on the detection result of the state-of-charge detection sensor Se4. The lever position detection sensor Se5 is a sensor that detects the position of a shift lever (not shown). For example, one of a stop position (P-range position), an automatic drive position (e.g., D-range position), a neutral position (N-range position), and a manual drive position (e.g., sports sequential position) can be selected as the position of the shift lever. In the present embodiment, the vehicle travels when the shift lever is at the automatic drive position or the manual drive position.

The internal combustion engine control unit 21 controls the internal combustion engine 11. The internal combustion engine control unit 21 decides target torque and a target rotational speed of the internal combustion engine 11, and controls operation of the internal combustion engine 11 according to these control targets. In the present embodiment, the internal combustion engine control unit 21 is capable of switching between torque control and rotational speed control of the internal combustion engine 11 according to the traveling state of the vehicle. The torque control is the control of sending a command of target torque to the internal combustion engine 11 to cause the torque of the internal combustion engine 11 to follow the target torque. The rotational speed control is the control of sending a command of a target rotational speed to the internal combustion engine 11 and deciding torque so as to cause the rotational speed of the internal combustion engine 11 to be closer to the target rotational speed.

A drive mode deciding section 31 is a function unit that decides the drive mode of the vehicle. The drive mode deciding unit 31 refers to, e.g., a mode selection map (not shown) to decide the drive mode to be implemented by the drive device 1 based on the vehicle speed, the accelerator operation amount, the amount of electricity stored in the electricity storage device 25, etc. In the present embodiment, the drive modes that can be selected by the drive mode deciding unit 31 include an electric drive mode (EV mode) and a hybrid drive mode (HEV mode). In the electric drive mode, with fuel supply to the internal combustion engine 11 being stopped, the torque of the rotating electrical machine 12 is transferred to the wheels 15 to move the vehicle. In the hybrid drive mode, with the internal combustion engine 11 outputting positive torque (torque in in such a direction that rotation of the wheels 15 is accelerated in the forward travel direction of the vehicle, the torque of both the internal combustion engine 11 and the rotating electrical machine 12 is transferred to the wheels 15 to move the vehicle. The present embodiment may be configured so that drive modes other than the above drive modes can be selected.

A shift mode selecting section 32 is a function unit that selects a shift mode. The shift mode selecting section 32 selects one shift mode from a first shift mode and a second shift mode. In the present embodiment, the shift mode selecting section 32 selects a shift mode based on a command from the driver. Specifically, the shift mode selecting section 32 selects a shift mode based on the position of the shift lever which is detected by the lever position detection sensor Se5. Specifically, the shift mode selecting section 32 selects the first shift mode if the detected position of the shift lever is the automatic drive position, and selects the second shift mode if the detected position of the shift lever is the manual drive position. In the present embodiment, the shift mode selecting section 32 corresponds to the "mode selecting portion" in the present invention.

The first shift mode is a shift mode (automatic shift mode) in which a target shift speed is automatically changed (and as a result, a speed ratio is changed) by a target shift speed deciding section 33 described below, according to a predetermined shift schedule. In the present embodiment, storage means such as a memory included in the control device 3 stores therein a shift map (see FIG. 3) that defines the shift schedule. The shift map defines the shift schedule based on the relation between the vehicle speed and the accelerator operation amount or the brake operation amount and the target shift speed. This shift schedule is defined so as to cause fuel efficiency at least during traveling of the vehicle (distance travelled per unit volume of fuel) to be closer to a maximum value. In the present embodiment, the second shift mode is a shift mode that is different from the first shift mode in conditions for starting the shift control. In the present embodiment, the second shift mode is a shift mode (manual shift mode) in which the target shift speed can be manually changed (and as a result, the speed ratio can be changed) based on driver's intension and regardless of the shift schedule defined in the shift map. When the second shift mode is implemented, a shift command (upshift command or downshift command) is output to an oil pressure control section 35 basically according to the same shift schedule as that of the first shift mode and also based on a predetermined shift lever operation by the driver.

The term "upshift" means to change the target shift speed to a higher shift speed (to relatively decrease the speed ratio). That is, the term "upshift" means to change the target shift speed to a shift speed higher than that before the change (to change the speed ratio to a speed ratio lower than that before the change). The term "downshift" means to change the target shift speed to a lower shift speed (to relatively increase the speed ratio). That is, the term "downshift" means to change the target shift speed to a shift speed lower than that before the change (to change the speed ratio to a speed ratio higher than that before the change).

Figure 3:
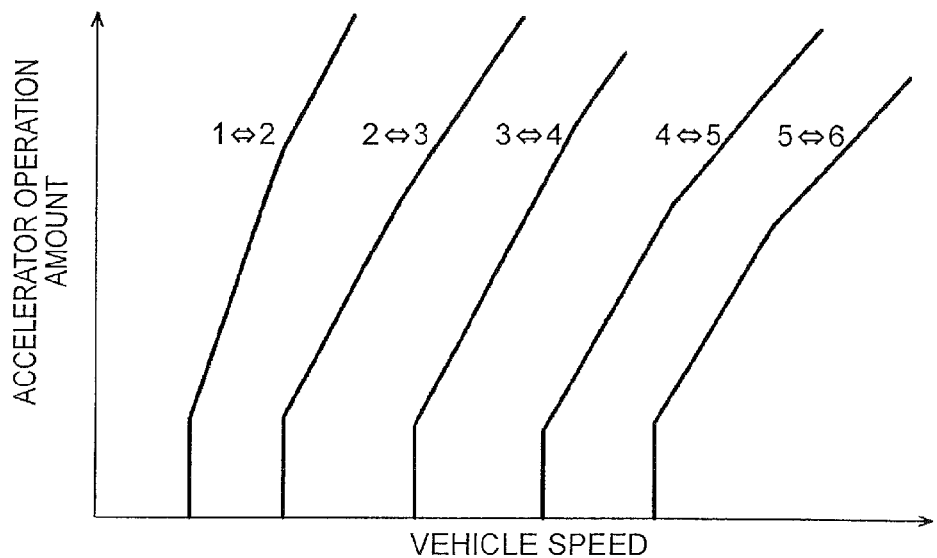
FIG. 3 is a schematic diagram showing an example of a shift map.

The target shift speed deciding section 33 is a function unit that decides a target shift speed according to the shift schedule defined in the shift map. The target shift speed deciding section 33 refers to, e.g., the shift map shown by way of example in FIG. 3, and decides a target shift speed to be formed by the speed change mechanism 13, based on the vehicle speed and the accelerator operation amount. In the present embodiment, the target shift speed deciding section 33 decides one specific shift speed selected from first to sixth speeds as a target shift speed. A plurality of shift lines are set in the shift map. As the vehicle speed and the accelerator operation amount change and an operating point on the shift map crosses any of the shift lines, the target shift speed deciding section 33 changes the target shift speed. For simplicity, FIG. 3 shows an example in which both upshift and downshift are determined based on a single shift line. However, a hysteresis may be provided, and upshift and downshift may be determined based on individual shift lines, i.e., an upshift line and a downshift line, respectively. If the target shift speed is changed, a shift command (upshift command or downshift command) according to the direction in which the target shift speed is changed is output to the oil pressure control section 35.

A rotating electrical machine control section 34 is a function unit that controls the rotating electrical machine 12. The rotating electrical machine control section 34 decides target torque and a target rotational speed of the rotating electrical machine 12 and controls operation of the rotating electrical machine 12 according to these control targets. In the present embodiment, the rotating electrical machine control section 34 is capable of switching between torque control and rotational speed control of the rotating electrical machine 12 according to the traveling state of the vehicle. The torque control is the control of sending a command of target torque to the rotating electrical machine 12 to cause the torque of the rotating electrical machine 12 to follow the target torque. The rotational speed control is the control of sending a command of a target rotational speed to the rotating electrical machine 12 and deciding torque so as to cause the rotational speed of the rotating electrical machine 12 to be closer to the target rotational speed.

The torque that can be output from the rotating electrical machine 12 is sometimes limited depending on the situation where the rotating electrical machine 12 is in. The rotating electrical machine 12 is capable of outputting, e.g., only the torque in the range of maximum torque predetermined by the specification or less (a concept in both positive and negative directions). The rotating electrical machine 12 is capable of outputting, e.g., only the torque in the range of upper limit torque, which is determined according to the rotational speed of the rotating electrical machine 12 and based on the relation with the maximum output predetermined by the specification, or less (a concept in both positive and negative directions). The maximum torque and the upper limit torque can vary according to the ambient temperature, the amount of electricity stored in the electricity storage device 25, etc. For example, the maximum torque and the upper limit torque may be reduced (based on an absolute value) if the ambient temperature is equal to or lower than a predetermined low temperature threshold. The maximum torque and the upper limit torque are sometimes individually limited in the positive direction and the negative direction. For example, if the amount of electricity stored in the electricity storage device 25 is equal to or smaller than a predetermined low electricity storage amount threshold, only the maximum torque and the upper limit torque in the positive direction may be reduced. If the amount of electricity stored in the electricity storage device 25 is equal to or larger than a predetermined high electricity storage amount threshold, only the maximum torque and the upper limit torque in the negative direction may be reduced (based on an absolute value). The upper and lower limits of the torque that can be output from the rotating electrical machine 12 are shown by broken lines in FIGS. 7 to 11.

The oil pressure control section 35 is a function unit that controls supply of an oil pressure to each engagement device (CL1, CL2, . . . ). The oil pressure control section 35 outputs an oil pressure command for each engagement device according to the decided target shift speed, and controls an oil pressure to be supplied to each engagement device via a hydraulic control device 28. The oil pressure control section 35 is capable of continuously controlling the oil pressure to be supplied to each engagement device by a proportional solenoid etc. according to the oil pressure command. An increase or decrease in engagement pressure of each engagement device is thus continuously controlled to control the engagement state of each engagement device. For example, the oil pressure control section 35 brings an intended one of the engagement devices (intended engagement device) into the disengaged state by controlling the oil pressure to be supplied to the intended engagement device to a value less than a disengagement boundary pressure. The oil pressure control section 35 brings an intended engagement device into the direct-coupling engaged state by controlling the oil pressure to be supplied to the intended engagement device to a value equal to or higher than an engagement boundary pressure. The oil pressure control section 35 brings an intended engagement device into a slip engaged state by controlling the oil pressure to be supplied to the intended engagement device to a slip engagement pressure that is equal to or higher than the disengagement boundary pressure and less than the engagement boundary pressure.

The "disengaged state" means the state where neither rotation nor torque is transferred between two engagement members that are engaged by an intended engagement device. The "direct-coupling engaged state" means the state where the two engagement members are engaged so as to rotate together. The "slip engaged state" means the state where the two engagement members are engaged with differential rotation therebetween so as to be able to transfer torque therebetween. When an intended engagement device is in the slip engaged state, two engagement members rotate relative to each other, and torque is transferred from the engagement member having a higher rotational speed toward the engagement member having a lower rotational speed. The magnitude of the torque that can be transferred when an intended engagement device is in the engaged state (a concept including both the direct-coupling engaged state and the slip engaged state) is determined according to the oil pressure to be supplied to the intended engagement device at that time (the engagement pressure of the intended engagement device). The magnitude of the torque at this time is defined as the transfer torque capacity of the intended engagement device. The transfer torque capacity of each engagement device can be continuously controlled according to an increase or decrease in oil pressure to be supplied thereto.

In the present embodiment, in response to a shift command from the target shift speed deciding section 33, the oil pressure control section 35 controls the oil pressure to be supplied to each engagement device CL1, CL2, . . . according to the changed target shift speed. At this time, the oil pressure control section 35 brings one of the engagement devices having been in the direct-coupling engaged state before shifting into the disengaged state, and brings one of the engagement devices having been in the disengaged state before shifting eventually into the direct-coupling engaged state via the slip engaged state. In the following description, in such switch shifting as described above, the first engagement device CL1 is newly brought into the disengaged state and the second engagement device CL2 is newly brought into the engaged state after switching of the shift speed. The oil pressure control section 35 controls the oil pressure to be supplied to each engagement device to control the engagement state thereof, thereby switching the shift speed to be implemented by the speed change mechanism 13.

A shift assist control section 41 is a function unit that executes shift assist control of increasing or decreasing the rotational speed of the input shaft I by increasing or decreasing the torque of the rotating electrical machine 12 to be transferred to the input shaft I during execution of the shift control of switching the shift speed to be implemented by the speed change mechanism 13. The shift assist control section 41 increases or decreases the torque of the rotating electrical machine 12 according to the direction in which the shift speed is switched (the direction in which the speed ratio is changed). An imaginary rotational speed of the input shaft I which is determined according to the vehicle speed and the speed ratio is defined as the "synchronous rotational speed Ns," and the synchronous rotational speeds Ns before and after shifting are defined as the "pre-shift synchronous rotational speed Nsa" and the "post-shift synchronous rotational speed Nsb," respectively. In downshift, the post-shift synchronous rotational speed Nsb is higher than the pre-shift synchronous rotational speed Nsa. In upshift, the relation therebetween is opposite. Namely, the post-shift synchronous rotational speed Nsb is lower than the pre-shift synchronous rotational speed Nsa.

In downshift, the shift assist control section 41 thus increases the rotational speed of the input shaft I by increasing the torque of the rotating electrical machine 12 to be transferred to the input shaft I by the shift assist control. Increasing the torque of the rotating electrical machine 12 herein means increasing the torque based on an absolute value (changing the torque in the positive direction). This includes causing the rotating electrical machine 12 outputting positive torque to output larger positive torque or causing the rotating electrical machine 12 outputting negative torque to output smaller negative torque or torque equal to or larger than zero. On the other hand, in upshift, the shift assist control section 41 reduces the rotational speed of the input shaft I by decreasing the torque of the rotating electrical machine 12 to be transferred to the input shaft I. Decreasing the torque of the rotating electrical machine 12 herein means decreasing the torque based on an absolute value (changing the torque in the negative direction). This includes causing the rotating electrical machine 12 outputting positive torque to output smaller positive torque or torque equal to or smaller than zero, or causing the rotating electrical machine 12 outputting negative torque to output larger negative torque.

The shift assist control section 41 can quickly cause the actual rotational speed of the input shaft I to be closer to the post-shift synchronous rotational speed Nsb by executing such shift assist control during execution of the shift control. Responsive shift control can thus be executed.

A possibility determining section 42 is a function unit that determines whether or not the rotating electrical machine 12 can output required input torque Tn for increasing or decreasing the rotational speed of the input shaft I according to a predetermined target rotational speed change rate At. As described above, the torque that can be output from the rotating electrical machine 12 is sometimes limited. The possibility determining section 42 therefore determines whether or not the rotating electrical machine 12 can reliably output the required input torque Tn based on such torque limitation on the rotating electrical machine 12. The possibility determining section 42 also determines whether or not the rotating electrical machine 12 and the internal combustion engine 11 can cooperatively output the required input torque Tn under predetermined conditions. Moreover, the possibility determining section 42 determines whether or not the rotating electrical machine 12 can output lower limit input torque To for increasing or decreasing the rotational speed of the input shaft I according to a predetermined lower limit rotational speed change rate Ao under predetermined conditions. These functions of the possibility determining section 42, the required input torque Tn, the lower limit input torque To, the target rotational speed change rate At, the lower limit rotational speed change rate Ao, etc. will be described in detail later with reference to the flowcharts of FIGS. 4 to 6.

A torque compensating section 43 is a function unit that compensates for a shortfall in the required input torque Tn in the shift assist control in the case where it is determined that the rotating electrical machine 12 cannot output the required input torque Tn. The torque compensating section 43 compensates for the shortfall in the required input torque Tn by using at least one of the output torque of the internal combustion engine 11 and the torque that is transferred by the shift engagement device (in this example, the second engagement device CL2 that is newly brought into the engaged state during the shift control). At this time, the torque compensating section 43 does not use the same (fixed) proportion between the output torque of the internal combustion engine 11 and the torque that is transferred by the second engagement device CL2 regardless of the situation, but uses a proportion that is variable according to the shift mode. The torque compensating section 43 includes a primary assisting component deciding section 44 and an allocation deciding section 45 in order to appropriately compensate for the shortfall in the required input torque Tn by using at least one of the output torque of the internal combustion engine 11 and the torque that is transferred by the second engagement device CL2 according to the shift mode.

The primary assisting component deciding section 44 is a function unit that decides a primary component that compensates for the shortfall in the required input torque Tn in the shift assist control in the case where it is determined that the rotating electrical machine 12 cannot output the required input torque Tn (this primary component is herein referred to as the "primary assisting component Sa"). The primary assisting component deciding section 44 decides the primary assisting component Sa from the internal combustion engine 11 and the shift engagement device (in this example, the second engagement device CL2) according to the shift mode implemented at the start of the shift assist control. That is, the primary assisting component deciding section 44 does not decide the same primary assisting component Sa regardless of the situation, but variably decides the primary assisting component Sa according to the shift mode.

The allocation deciding section 45 is a function unit that decides allocation of torque when increasing or decreasing the rotational speed of the input shaft I in the shift assist control. The allocation deciding section 45 decides allocation of torque between the rotating electrical machine 12 and the primary assisting component Sa (the internal combustion engine 11 and/or the second engagement device CL2) when necessary based on the determination result of the possibility determining section 42, the decision of the primary assisting component deciding section 44, etc. The primary assisting component deciding section 44 and the allocation deciding section 45 cooperate with each other to compensate for the shortfall in the required input torque Tn by using at least one of the output torque of the internal combustion engine 11 and the torque that is transferred by the second engagement device CL2 according to the shift mode. The function of the torque compensating section 43 (the primary assisting component deciding section 44 and the allocation deciding section 45) will be described in detail later with reference to the flowcharts of FIGS. 4 to 6.

3. Details of Shift Assist Control

Specific details of the shift assist control according to the present embodiment will be described. In the present embodiment, the shift assist control will be described particularly with respect to the shift assist control in downshift during coast traveling (power-off downshift) (power-off downshift assist control). The "coast traveling" means traveling in the state where the accelerator operation amount is equal to or smaller than a predetermined reference operation amount (which can be set to any value such as, e.g., 1 to 5%). Each process in the shift assist control described below is performed by each function unit of the control device 3, with the shift assist control section 41, the possibility determining section 42, and the torque compensating section 43 (the primary assisting component deciding section 44 and the allocation deciding section 45) serving as a core. For simplicity, in the following description, the transfer torque capacity of the second engagement device CL2 is given as a capacity calculated for the input shaft I. The "transfer torque capacity calculated for the input shaft I" refers to the torque (transfer torque capacity) after torque conversion based on the position of the input shaft I according to the position of the second engagement device CL2 on the power transmission path connecting the input shaft I and the output shaft O.

Figure 4:
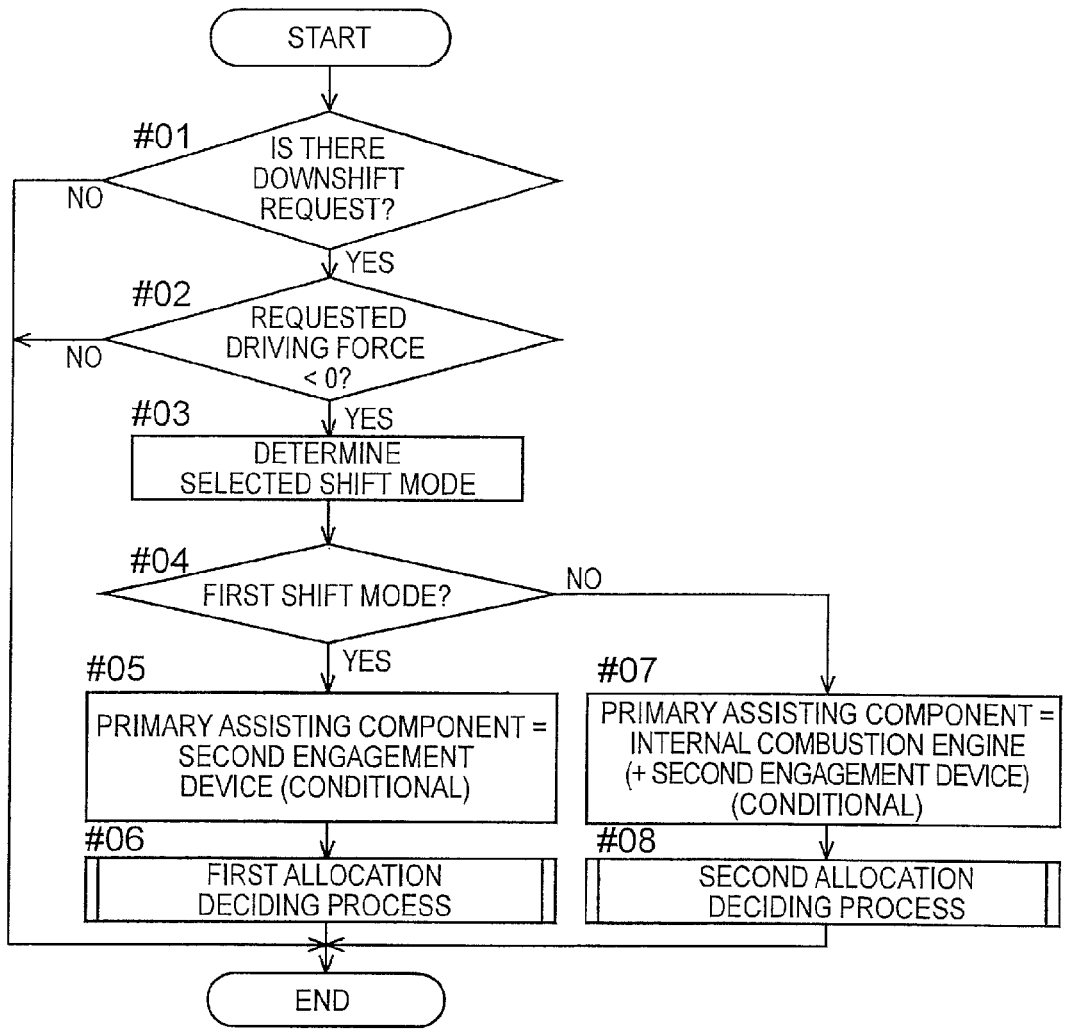
FIG. 4 is a flowchart showing overall processing procedures of shift assist control.

In the present embodiment, it is assumed that the position of the shift lever is the automatic drive position or the manual drive position and at least the vehicle is traveling. In this case, the vehicle is traveling in the first shift mode or the second shift mode. In this state, as shown in FIG. 4, it is determined whether or not there is a downshift request (step #01). That is, it is determined whether or not a downshift command has been output based on the determination result of the target shift speed deciding section 33 according to the shift schedule defined in the shift map or on the shift lever operation by the driver. If there is no downshift request, that is, if there is no shift request or if there is an upshift request (#01: No), the shift assist control (power-off downshift assist control) is terminated, and the shift assist control is started again.

If there is a downshift request (#01: Yes), it is then determined whether or not a requested driving force D is negative (D<0) (#02). The requested driving force D is the torque that is required to drive the vehicle if its sign is positive (D>0). Accordingly, if the requested driving force D is negative, that means that the vehicle is being subjected to the torque decelerating the vehicle (travel resistance). If the requested driving force D is zero or more (#02: No), the shift assist control (power-off downshift assist control) is terminated, and the shift assist control is started again.

If the requested driving force D is negative (#02: Yes), it is then determined by the shift mode selecting section 32 which shift mode has been implemented at that time (#03). Specifically, it is determined based on information on the shift lever position that is detected by the lever position detection sensor Se5 which of the first shift mode and the second shift mode has been selected. If the first shift mode has been selected (#04: Yes), the primary assisting component deciding section 44 etc. conditionally decides the second engagement device CL2 as the primary assisting component Sa (#05), and the allocation deciding section 45 etc. performs a first allocation deciding process (#06). On the other hand, if the second shift mode has been selected (#04: No), the primary assisting component deciding section 44 etc. conditionally decides the internal combustion engine 11 (and the second engagement device CL2 depending on the situation) as the primary assisting component Sa (#07), and the allocation deciding section 45 etc. performs a second allocation deciding process (#08).

Figure 5:
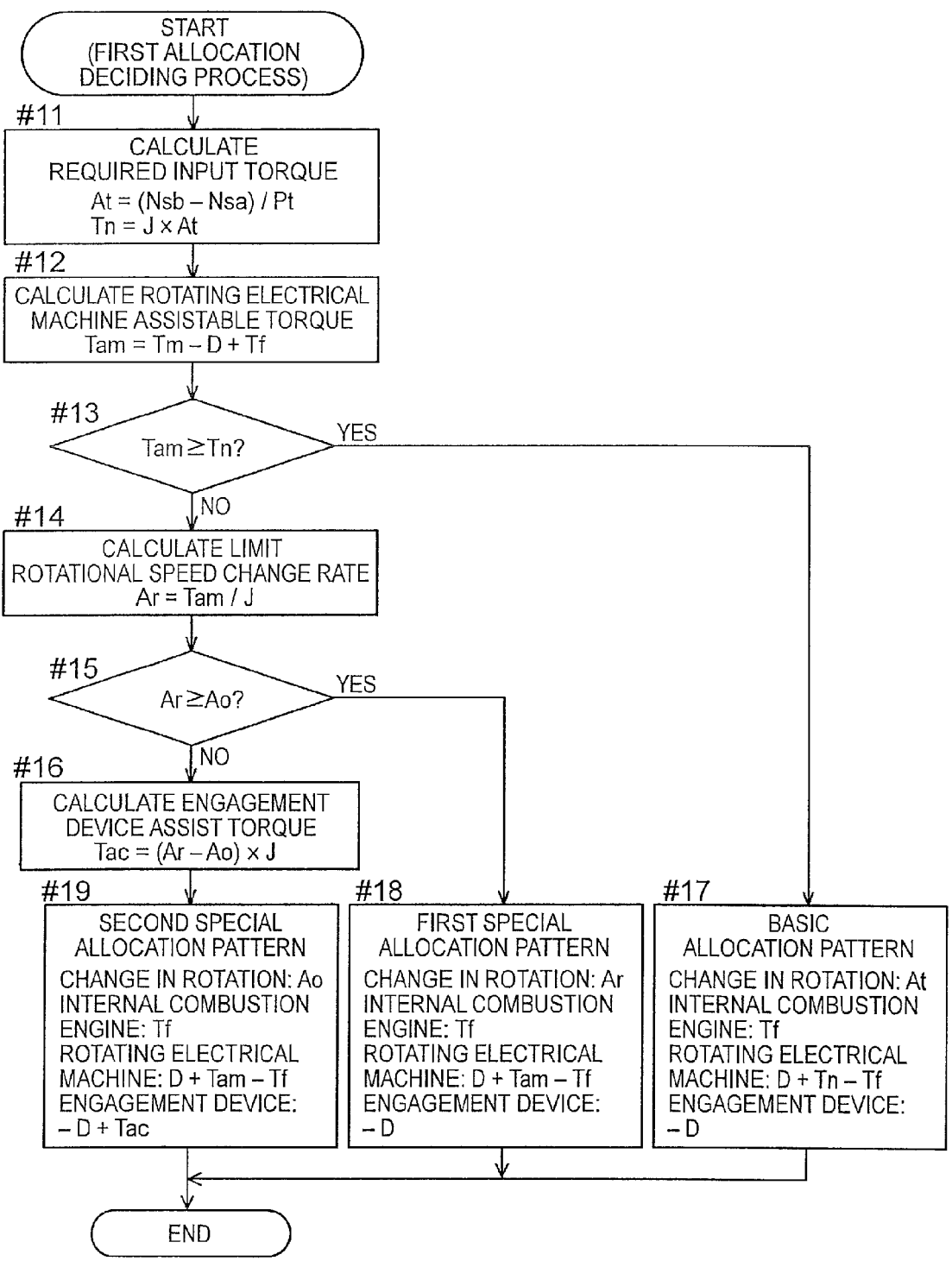
FIG. 5 is a flowchart showing processing procedures of a first allocation deciding process.

As shown in FIG. 5, in the first allocation deciding process, the possibility determining section 42 first calculates the required input torque Tn (#11). The required input torque Tn is the torque that is required to be transferred to the input shaft I in order to increase the rotational speed of the input shaft I according to the predetermined target rotational speed change rate At. The target rotational speed change rate At of the input shaft I is set so that the shift control (particularly a so-called inertia phase in this case) can be completed in predetermined target shift time Pt. The target rotational speed change rate At is calculated based on the difference between the synchronous rotational speeds Ns before and after shifting and the target shift time Pt. Specifically, the target rotational speed change rate At is calculated by dividing the post-shift synchronous rotational speed Nsb minus the pre-shift synchronous rotational speed Nsa by the target shift time Pt. The required input torque Tn is calculated based on the target rotational speed change rate At thus calculated and total inertia J (the sum of inertia of the rotor of the rotating electrical machine 12 and inertia of the internal combustion engine 11). Specifically, the required input torque Tn is calculated by multiplying the total inertial J and the target rotational speed change rate At.

Subsequently, the possibility determining section 42 calculates rotating electrical machine assistable torque Tam (#12). The rotating electrical machine assistable torque Tam is the torque that can be used to increase the rotational speed of the input shaft I for shift assist out of the torque that can be output from the rotating electrical machine 12. The rotating electrical machine assistable torque Tam is calculated based on rotating electrical machine torque Tm, the requested driving force D, and friction torque Tf of the internal combustion engine 11. The rotating electrical machine torque Tm is the smaller one of maximum torque and upper limit torque according to the post-shift synchronous rotational speed Nsb for the rotating electrical machine 12. The friction torque Tf is the sliding resistance etc. that is caused when the output shaft (crankshaft etc.) of the internal combustion engine 11 rotates, and has a negative value (Tf<0). The rotating electrical machine assistable torque Tam is calculated by subtracting the requested driving force D from the rotating electrical machine torque Tm and adding the friction torque Tf having a negative value.

Thereafter, the possibility determining section 42 determines whether or not the rotating electrical machine 12 can output the required input torque Tn. In this example, the possibility determining section 42 determines whether or not the rotating electrical machine 12 can output, within the range of the torque limitation, the required input torque Tn in addition to the torque for absorbing the requested driving force D having a negative value and the torque for compensating for the friction torque Tf. Specifically, the possibility determining section 42 determines whether or not the rotating electrical machine assistable torque Tam is equal to or larger than the required input torque Tn (#13).

If it is determined that the rotating electrical machine 12 can output the required input torque Tn, that is, if it is determined that the rotating electrical machine assistable torque Tam is equal to or larger than the required input torque Tn (#13: Yes), the allocation deciding section 45 decides a basic allocation pattern as a torque allocation pattern (#17). The basic allocation pattern is such a pattern that only the rotating electrical machine 12 is the primary component that provides the required input torque Tn. That is, in the basic allocation pattern, the rotating electrical machine 12 is caused to output all of the required input torque Tn.

Figure 7:
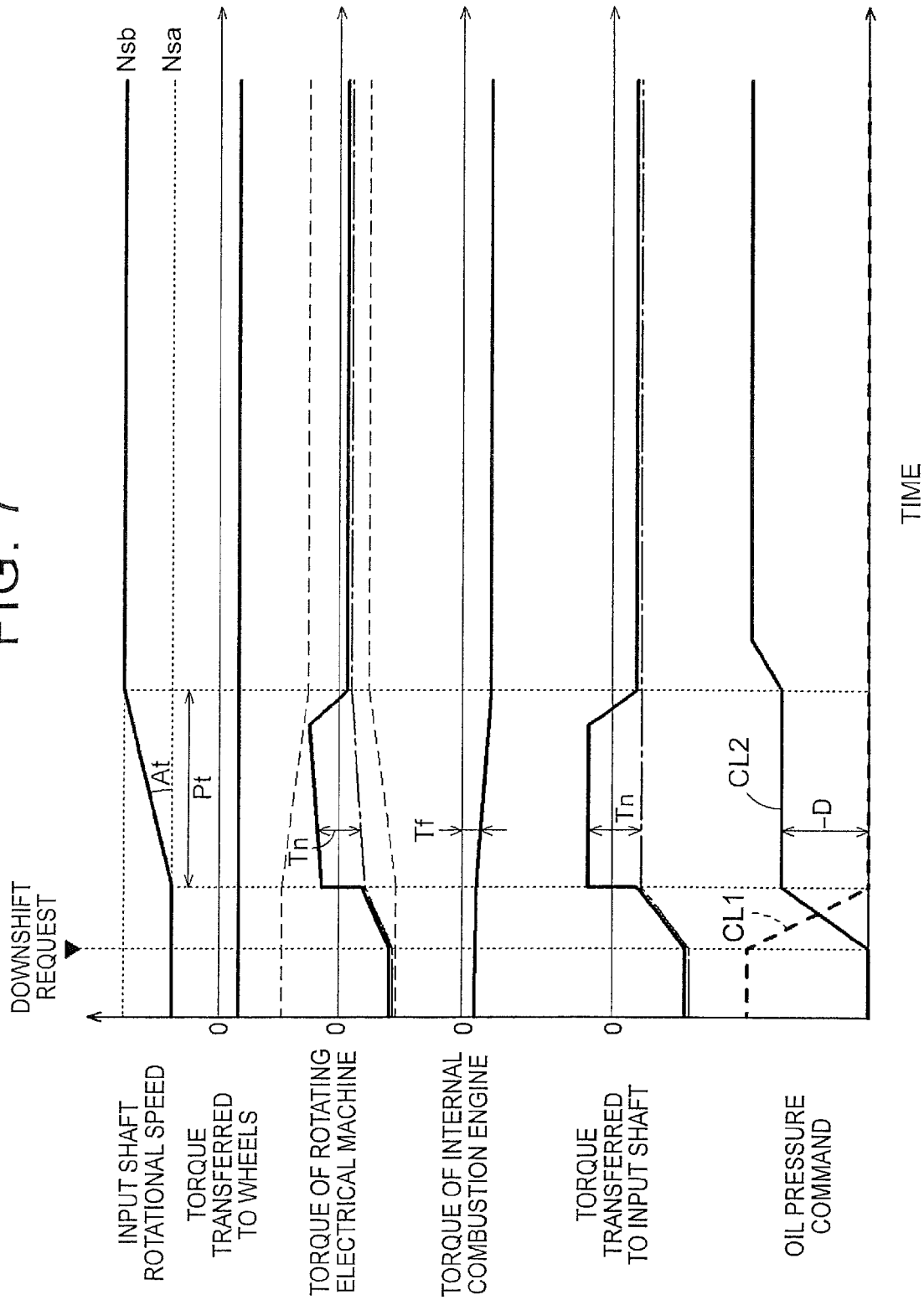
FIG. 7 is a timing chart showing an example of the operating state of each part during shift assist control.

In this basic allocation pattern, the internal combustion engine 11 causes the input shaft I to be subjected to resistance corresponding to the friction torque Tf. The transfer torque capacity of the second engagement device CL2 has a value corresponding to the requested driving force D. If the requested driving force D has a negative value as in this example, the transfer torque capacity of the second engagement device CL2 has a value with an opposite sign (−D). The rotating electrical machine 12 outputs the sum of the torque for maintaining the state where the requested driving force D is transferred to the wheels 15, the required input torque Tn for shift assist, and the torque (−Tf) for compensating for the friction torque Tf. Accordingly, as shown in FIG. 7, the torque that is transferred to the wheels 15 is maintained at the requested driving force D, and in this state, the rotational speed of the input shaft I increases to the post-shift synchronous rotational speed Nsb at the target rotational speed change rate At. That is, responsive downshift is implemented in the target shift time Pt.

If it is determined that the rotating electrical machine 12 cannot output the required input torque Tn, that is, if it is determined that the rotating electrical machine assistable torque Tam is smaller than the required input torque Tn (#13: No), the possibility determining section 42 calculates a limit rotational speed change rate Ar (#14). The limit rotational speed change rate Ar is calculated based on the rotating electrical machine assistable torque Tam and the total inertia J. Specifically, the limit rotational speed change rate Ar is calculated by dividing the rotating electrical machine assistable torque Tam by the total inertia J.

Subsequently, the possibility determining section 42 determines whether or not the limit rotational speed change rate Ar is equal to or higher than the lower limit rotational speed change rate Ao (#15). The lower limit rotational speed change rate Ao of the input shaft I is set so that the shift control (particularly the inertia phase in this case) can be completed in predetermined upper limit shift time Pu. The upper limit shift time Pu is determined so that the heat generation amount of the second engagement device CL2 that is brought into the slip engaged state in the shift control (so-called inertia phase) is equal to or smaller than a predetermined acceptable heat generation amount Qp. Such an upper limit shift time Pu can be empirically obtained in advance based on, e.g., preliminary experiments etc. for verifying heat resistance capability of the second engagement device CL2. The lower limit rotational speed change rate Ao is calculated based on the difference between the synchronous rotational speeds Ns before and after shifting and the upper limit shift time Pu. Specifically, the lower limit rotational speed change rate Ao is calculated by dividing the post-shift synchronous rotational speed Nsb minus the pre-shift synchronous rotational speed Nsa by the upper limit shift time Pu.

In the present embodiment, the lower limit input torque To is the torque that is required to be transferred to the input shaft I in order to increase the rotational speed of the input shaft I according to the lower limit rotational speed change rate Ao. Accordingly, determining whether or not the limit rotational speed change rate Ar is equal to or higher than the lower limit rotational speed change rate Ao is equivalent to determining whether or not the rotating electrical machine 12 can output the lower limit input torque To. In this example, determining whether or not the limit rotational speed change rate Ar is equal to or higher than the lower limit rotational speed change rate Ao is equivalent to determining whether or not the rotating electrical machine 12 can output the lower limit input torque To in addition to the torque for absorbing the requested driving force D having a negative value and the torque for compensating for the friction torque Tf.

If it is determined that the rotating electrical machine 12 can output the lower limit input torque To, that is, if it is determined the limit rotational speed change rate Ar is equal to or higher than the lower limit rotational speed change rate Ao (#15: Yes), the allocation deciding section 45 decides a first special allocation pattern as the torque allocation pattern (#18). The first special allocation pattern is such a pattern that not all of the required input torque Tn can be output and only the rotating electrical machine 12 is the primary component that provides a part of the required input torque Tn. That is, in the first special allocation pattern, the rotating electrical machine 12 is caused to output the rotating electrical machine assistable torque Tam that is equal to or larger than the lower limit input torque To and smaller than the required input torque Tn.

Figure 8:
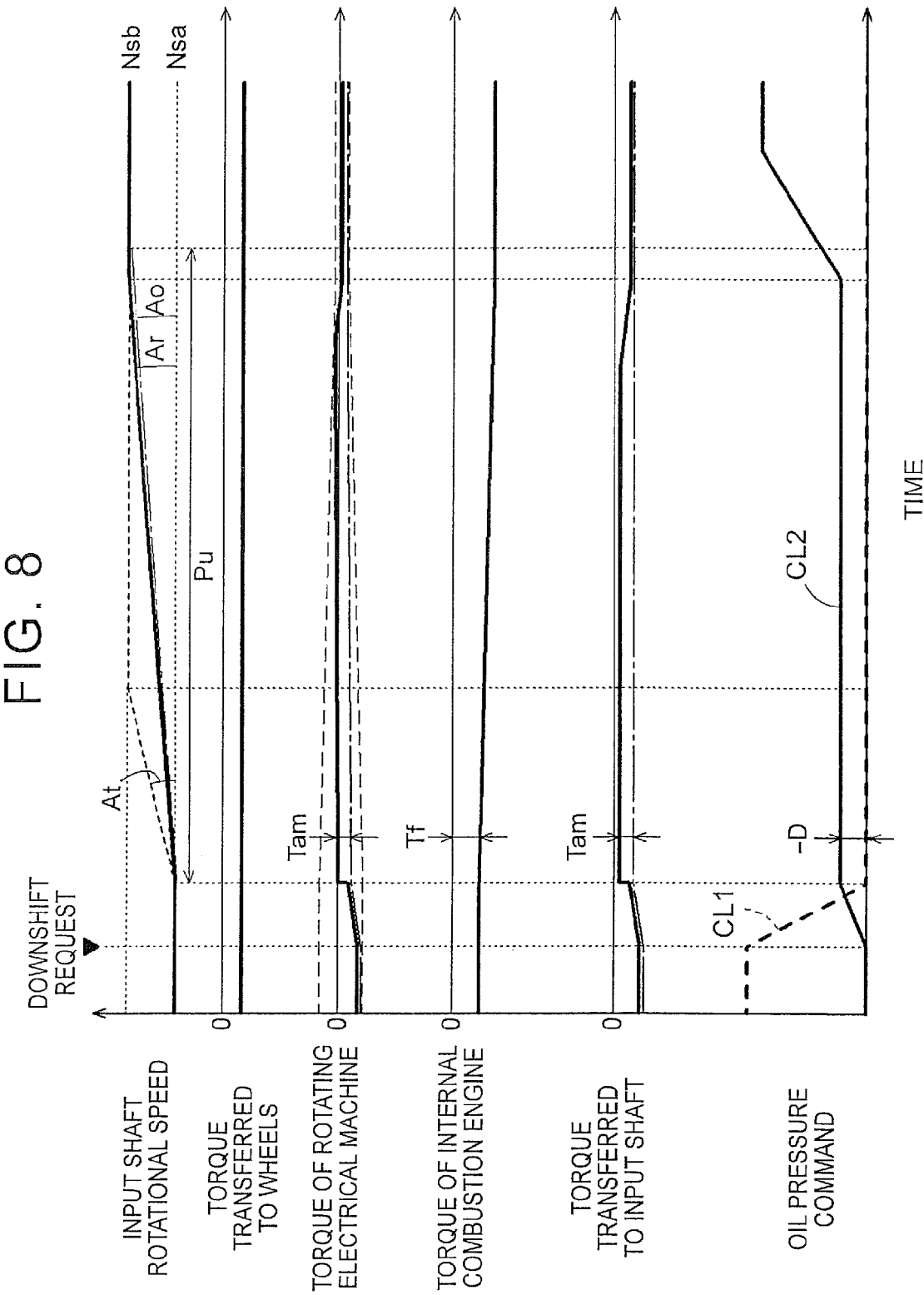
FIG. 8 is a timing chart showing an example of the operating state of each part during shift assist control.

In this first special allocation pattern, the internal combustion engine 11 causes the input shaft I to be subjected to resistance corresponding to the friction torque Tf. The transfer torque capacity of the second engagement device CL2 has a value corresponding to the requested driving force D (−D). The rotating electrical machine 12 outputs the sum of the torque for maintaining the state where the requested driving force D is transferred to the wheels 15, the rotating electrical machine assistable torque Tam for partial shift assist, and the torque (−Tf) for compensating for the friction torque Tf. Accordingly, as shown in FIG. 8, the torque that is transferred to the wheels 15 is maintained at the requested driving force D, and in this state, the rotational speed of the input shaft I increases to the post-shift synchronous rotational speed Nsb at the limit rotational speed change rate Ar that is equal to or higher than the lower limit rotational speed change rate Ao and lower than the target rotational speed change rate At. That is, relatively responsive downshift is implemented while suppressing shift shock.

If it is determined that the rotating electrical machine 12 cannot output the lower limit input torque To, that is, if it is determined that the limit rotational speed change rate Ar is lower than the lower limit rotational speed change rate Ao (#15: No), the allocation deciding section 45 calculates engagement device assist torque Tac (#16). The engagement device assist torque Tac is the capacity that is used to increase the rotational speed of the input shaft I for shift assist out of the transfer torque capacity of the second engagement device CL2. The engagement device assist torque Tac in the first allocation deciding process is calculated based on the limit rotational speed change rate Ar, the lower limit rotational speed change rate Ao, and the total inertia J. Specifically, the engagement device assist torque Tac is calculated by multiplying the limit rotational speed change rate Ar minus the lower limit rotational speed change rate Ao by the total inertia J.

The allocation deciding section 45 decides a second special allocation pattern as the torque allocation pattern (#19). The second special allocation pattern is such a pattern that not all of the required input torque Tn can be output and the rotating electrical machine 12 and the second engagement device CL2 are the primary components that provide a part of the required input torque Tn. That is, in the second special allocation pattern, the primary assisting component deciding section 44 decides the second engagement device CL2 as a single primary assisting component Sa that assists shift assist of the rotating electrical machine 12. At this time, as can be seen from the above description, the second engagement device CL2 is decided as the primary assisting component Sa on condition that it is determined that the rotating electrical machine 12 cannot output the lower limit input torque To (#15: No).

Figure 9:
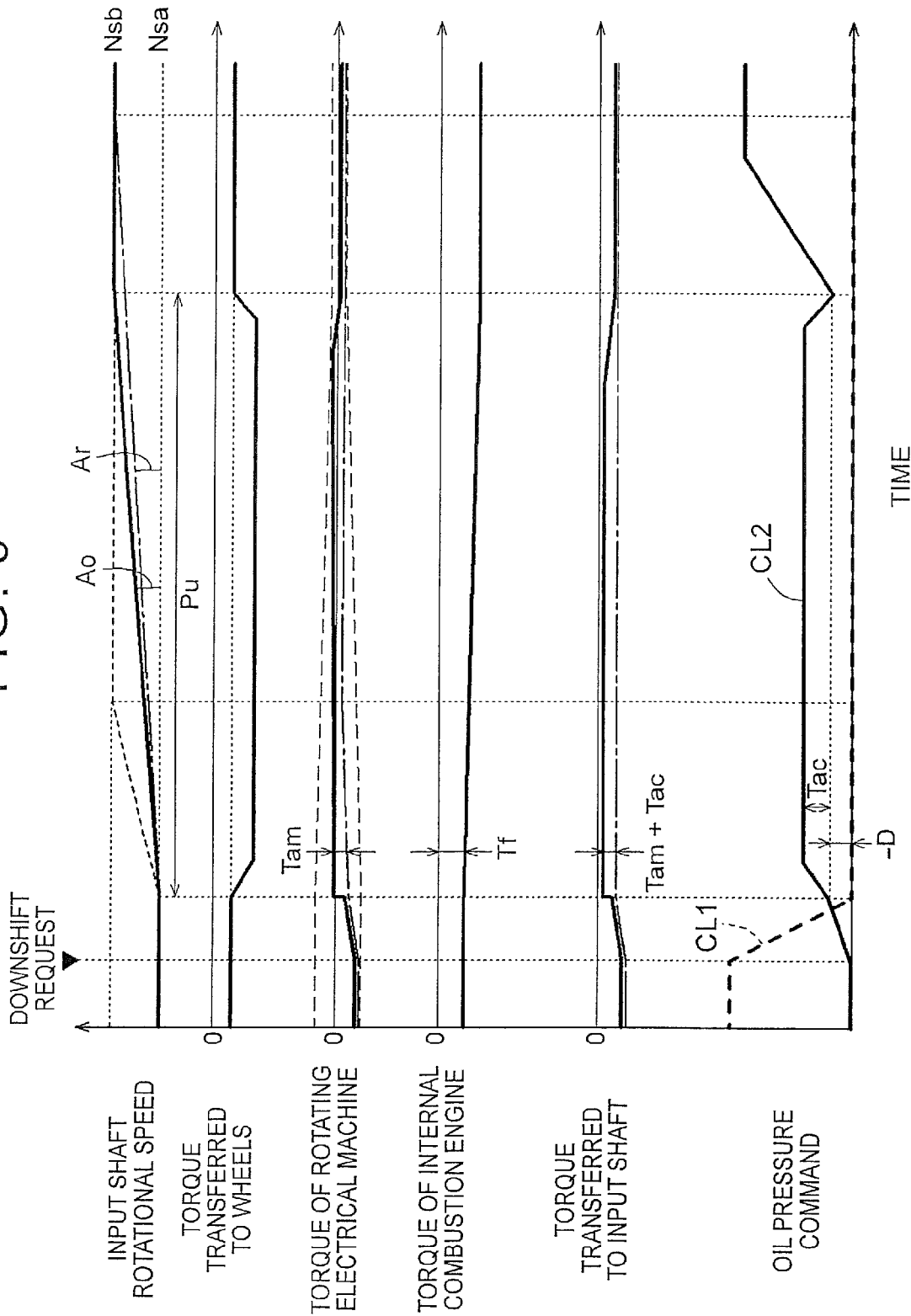
FIG. 9 is a timing chart showing an example of the operating state of each part during shift assist control.

In this second special allocation pattern, the internal combustion engine 11 causes the input shaft I to be subjected to resistance corresponding to the friction torque Tf. The rotating electrical machine 12 outputs the sum of the torque for maintaining the state where the requested driving force D is transferred to the wheels 15, the rotating electrical machine assistable torque Tam for partial shift assist, and the torque (−Tf) for compensating for the friction torque Tf. The transfer torque capacity of the second engagement device CL2 is the sum of the value (−D) corresponding to the requested driving force D and the engagement device assist torque Tac. Accordingly, as shown in FIG. 9, the rotational speed of the input shaft I increases to the post-shift synchronous rotational speed Nsb at the lower limit rotational speed change rate Ao that is higher than the limit rotational speed change rate Ar. In this case, relatively responsive downshift is implemented while suppressing thermal degradation of the second engagement device CL2, as compared to the case where the second engagement device CL2 does not function as the primary assisting component Sa (see the rotational speed of the input shaft I which is shown by chain line). Since the transfer torque capacity of the second engagement device CL2 is increased by the amount corresponding to the engagement device assist torque Tac, the torque that is transferred to the wheels 15 becomes slightly smaller than the requested driving force D. However, suppression of thermal degradation of the second engagement device CL2 which is achieved by reducing the shift control time is prioritized in the present embodiment.

Figure 6:
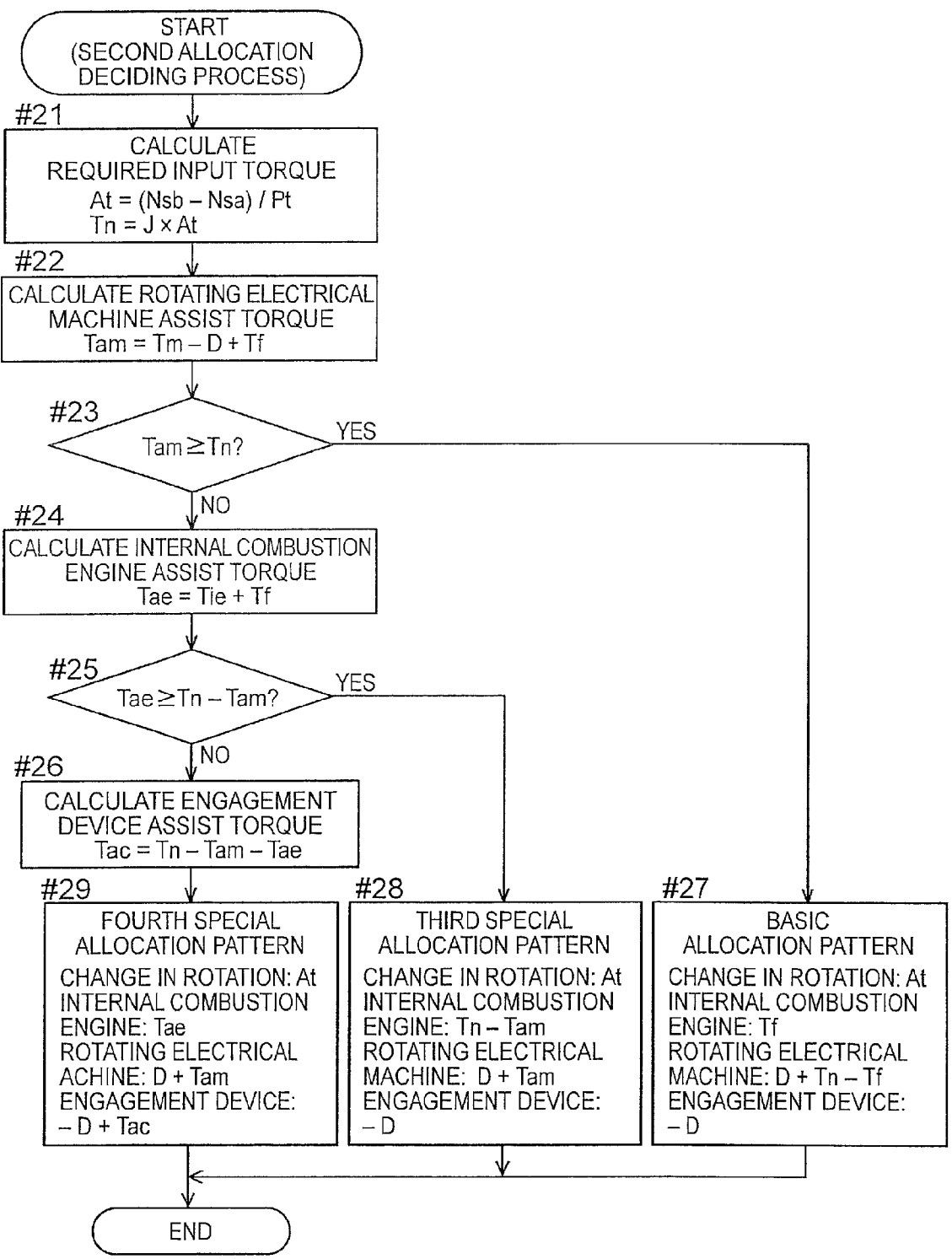
FIG. 6 is a flowchart showing processing procedures of a second allocation deciding process.

As shown in FIG. 6, in the second allocation deciding process, the required input torque Tn is calculated (#21), the rotating electrical machine assistable torque Tam is calculated (#22), and it is determined whether or not the rotating electrical machine assistable torque Tam is equal to or larger than the required input torque Tn (#23). If it is determined that the rotating electrical machine assistable torque Tam is equal to or larger than the required input torque Tn (#23: Yes), the basic allocation pattern is decided as the torque allocation pattern (#27). These steps are similar to steps #11 to #13 and #17 in the first allocation deciding process.

If it is determined that the rotating electrical machine 12 cannot output the required input torque Tn, that is, if it is determined that the rotating electrical machine assistable torque Tam is smaller than the required input torque Tn (#23: No), the possibility determining section 42 calculates internal combustion engine assist torque Tae (#24). The internal combustion engine assist torque Tae is the torque that can be used to increase the rotational speed of the input shaft I for shift assist out of the torque that can be additionally output from the internal combustion engine 11. The internal combustion engine assist torque Tae is calculated based on internal combustion engine maximum increase torque Tie and the friction torque Tf. The internal combustion engine maximum increase torque Tie is a maximum value of the torque that can be additionally output from the internal combustion engine 11. Specifically, the internal combustion engine assist torque Tae is calculated by adding the friction torque Tf having a negative value to the internal combustion engine maximum increase torque Tie.

Subsequently, the possibility determining section 42 determines whether or not the rotating electrical machine 12 and the internal combustion engine 11 can cooperatively output the required input torque Tn. In this example, the possibility determining section 42 determines whether or not the internal combustion engine 11 can output the torque corresponding to the difference between the required input torque Tn and the rotating electrical machine assistable torque Tam. This is determined based on the internal combustion engine assist torque Tae, the required input torque Tn, and the rotating electrical machine assistable torque Tam. Specifically, the possibility determining section 42 determines whether or not the internal combustion engine assist torque Tae has a value equal to or larger than the required input torque Tn minus the rotating electrical machine assistable torque Tam (required differential value) (#25).

If it is determined that the internal combustion engine 11 can output the torque corresponding to the shortfall in the required input torque Tn, that is, if it is determined that the internal combustion engine assist torque Tae is equal to or larger than the required differential value (#25: Yes), the allocation deciding section 45 decides a third special allocation pattern as the torque allocation pattern (#28). The third special allocation pattern is such a pattern that the rotating electrical machine 12 and the internal combustion engine 11 are the primary components that provide the required input torque Tn. That is, in the third special allocation pattern, the primary assisting component deciding section 44 includes the internal combustion engine 11 as the primary assisting component Sa that assists shift assist of the rotating electrical machine 12. In the third special allocation pattern, the rotating electrical machine 12 and the internal combustion engine 11 which function cooperatively are caused to output all of the required input torque Tn.

In the third special allocation pattern, the internal combustion engine 11 outputs the required input torque Tn minus the rotating electrical machine assistable torque Tam (required differential value). This output torque of the internal combustion engine 11 is the torque after offsetting the friction torque Tf. The rotating electrical machine 12 outputs the sum of the torque for maintaining the state where the requested driving force D is transferred to the wheels 15 and the rotating electrical machine assistable torque Tam for partial shift assist. The transfer torque capacity of the second engagement device CL2 is a value (−D) corresponding to the requested driving force D. Accordingly, as shown in FIG. 10, the torque that is transferred to the wheels 15 is maintained at the requested driving force D, and in this state, the rotational speed of the input shaft I increases to the post-shift synchronous rotational speed Nsb at the target rotational speed change rate At. That is, responsive downshift is implemented in the target shift time Pt. Since the internal combustion engine 11 outputs the predetermined torque, fuel efficiency decreases slightly. However, since the second shift mode is the shift control that is mainly based on the driver's intention, improving downshift response as much as possible is prioritized in the present embodiment.

If it is determined that the required input torque Tn cannot be output even by the cooperation between the rotating electrical machine 12 and the internal combustion engine 11, that is, if it is determined that the internal combustion engine assist torque Tae is smaller than the required differential value (#25: No), the allocation deciding section 45 calculates the engagement device assist torque Tac (#26). The engagement device assist torque Tac is the capacity that is used to increase the rotational speed of the input shaft I for shift assist out of the transfer torque capacity of the second engagement device CL2. The engagement device assist torque Tac in the second allocation deciding process is calculated based on the required input torque Tn, the rotating electrical machine assistable torque Tam, and the internal combustion engine assist torque Tae. Specifically, the engagement device assist torque Tac is calculated by subtracting both the rotating electrical machine assistable torque Tam and the internal combustion engine assist torque Tae from the required input torque Tn.

The allocation deciding section 45 decides a fourth special allocation pattern as the torque allocation pattern (#29). The fourth special allocation pattern is such a pattern that the rotating electrical machine 12, the internal combustion engine 11, and the second engagement device CL2 are the primary components that provide the required input torque Tn. That is, in the fourth special allocation pattern, the primary assisting component deciding section 44 includes the second engagement device CL2 in addition to the internal combustion engine 11 as the primary assisting component Sa that assists shift assist of the rotating electrical machine 12. In the fourth special allocation pattern, the rotating electrical machine 12, the internal combustion engine 11, and the second engagement device CL2 which function cooperatively are caused to output all of the required input torque Tn.

In the fourth special allocation pattern, the internal combustion engine 11 outputs the internal combustion engine assist torque Tae. The internal combustion engine assist torque Tae is obtained as a value having the friction torque Tf (<0) being offset (Tae=Tie+Tf). The rotating electrical machine 12 outputs the sum of the torque for maintaining the state where the requested driving force D is transferred to the wheels 15 and the rotating electrical machine assistable torque Tam for partial shift assist. The transfer torque capacity of the second engagement device CL2 is the sum of the value (−D) corresponding to the requested driving force D and the engagement device assist torque Tac. Accordingly, as shown in FIG. 11, the rotational speed of the input shaft I increases to the post-shift synchronous rotational speed Nsb at the target rotational speed change rate Ao. That is, responsive downshift is implemented in the target shift time Pt. Since the internal combustion engine 11 outputs the predetermined torque, fuel efficiency decreases slightly. Moreover, since the transfer torque capacity of the second engagement device CL2 is increased by the amount corresponding to the engagement device assist torque Tac, the torque that is transferred to the wheels 15 becomes slightly smaller than the requested driving force D. However, since the second shift mode is the shift control that is mainly based on the driver's intention, improving downshift response as much as possible is prioritized in the present embodiment.

As described above, the control device 3 according to the present embodiment can appropriately decide the primary assisting component Sa according to the respective control characteristics of the first shift mode serving as the automatic shift mode and the second shift mode serving as the manual shift mode. The control device 3 can appropriately compensate for the shortfall in the required input torque Tn according to the control characteristics of each shift mode by using at least one of the output torque of the internal combustion engine 11 and the torque that is transferred by the shift engagement device (in this example, the second engagement device CL2) according to the shift mode. Accordingly, the control device 3 can be implemented which is capable of implementing appropriate responsive downshift even in situations where there is not enough of the torque of the rotating electrical machine 12 which can be used for shift assist. In particular, in view of fuel efficiency during traveling of the vehicle and suppression of shift shock, etc., excellent overall control characteristics for fuel efficiency, shift shock, response, etc. during the power-off downshift control can be maintained according to the situation.

4. Other Embodiments

Lastly, other embodiments of the control device according to the present invention will be described. Configurations disclosed in each of the following embodiments can be combined with those disclosed in other embodiments as appropriate as long as no inconsistency arises.

Figure 12A:
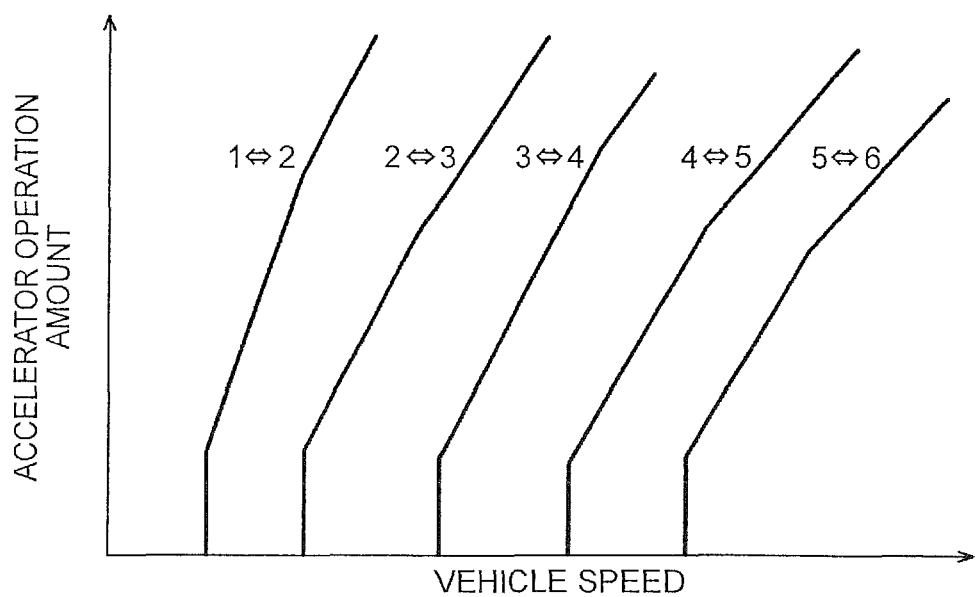
FIG. 12 shows diagrams showing other examples of the shift map.
Figure 12B:
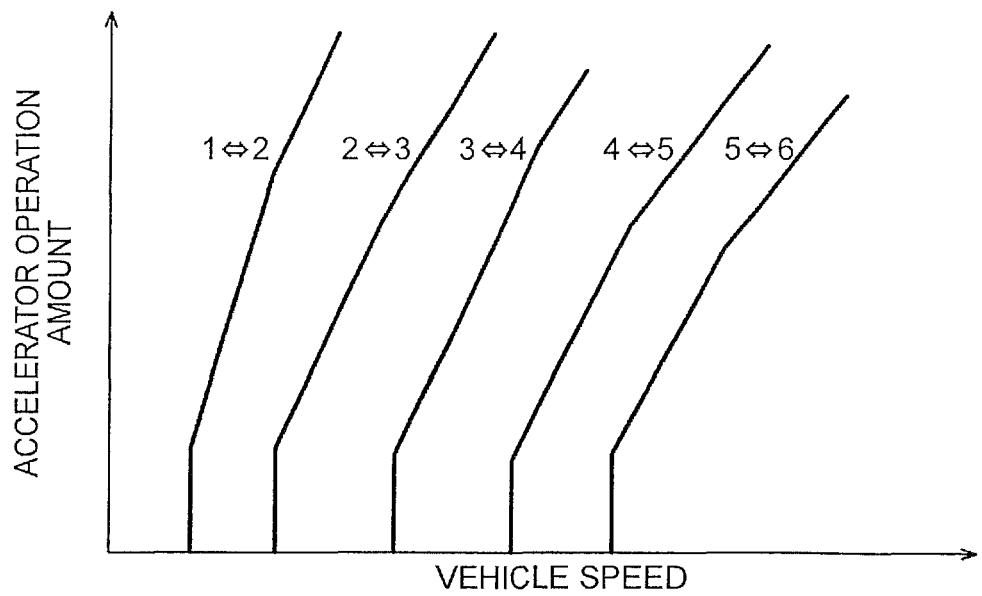

(1) The above embodiment is described with respect to an example in which the second shift mode is different from the first shift mode in the conditions for starting the shift control, and specifically an example in which the first shift mode is the automatic shift mode and the second shift mode is the manual shift mode. However, embodiments of the present invention are not limited to this. In the case where both the first shift mode and the second shift mode are the automatic shift modes, the shift map (shift schedule) that is referred to, for example, may be different between the first and second shift modes. For example, as shown in FIG. 12, the shift schedule in the second shift mode (FIG. 12B) may be such a shift schedule that the target shift speed for the vehicle speed is set to a relatively lower vehicle speed side as compared to the shift schedule in the first shift mode (FIG. 12A). In such a configuration, the second shift mode is a mode which is different from the first shift mode in the conditions for starting the shift control and in which acceleration response in downshift is higher than that in the first shift mode.

Alternatively, the second shift mode may be a mode different from the first shift mode in the processing of the shift control. When both the first shift mode and the second shift mode are the automatic shift modes that refer to a common shift map (shift schedule), the primary component that executes the shift assist control may be different (the basic allocation pattern may be different) between the first and second shift modes from the beginning. For example, in the second shift mode, the internal combustion engine 11 may also output a certain amount of torque from the beginning, and the rotating electrical machine 12 and the internal combustion engine 11 may cooperate with each other from the beginning to execute shift assist control. In such a configuration, the second shift mode is a mode in which time required for control for downshift is shorter than that in the first shift mode.

The first shift mode and the second shift mode may be different from each other in the conditions for starting the shift control and may be different from each other in the processing. In these configurations as well, the primary assisting component Sa can be appropriately decided according to the respective control characteristics of the first shift mode and the second shift mode which are different from each other in at least one of the conditions for starting the shift control and the processing. Accordingly, the control device 3 can be implemented which is capable of performing appropriate responsive downshift even if there is not enough of the torque of the rotating electrical machine 12 which can be used for shift assist.

(2) The above embodiment is described with respect to an example in which in the case where the rotating electrical machine 12 cannot output the required input torque Tn when the first shift mode is selected, the second engagement device CL2 serves as the primary assisting component Sa on condition that the rotating electrical machine 12 cannot even output the lower limit input torque To. However, embodiments of the present invention are not limited to this. For example, in such a case, the second engagement device CL2 may unconditionally serve as the primary assisting component Sa regardless of the relation with the lower limit input torque To. In this case, the engagement device assist torque Tac can be calculated based on the required input torque Tn and the rotating electrical machine assistable torque Tam. Specifically, the engagement device assist torque Tac can be calculated by subtracting the rotating electrical machine assistable torque Tam from the required input torque Tn. In this manner, shift shock may be permitted to some extent to prioritize improvement in downshift response.

(3) The above embodiment is described with respect to an example in which in the case where the required input torque Tn cannot be output even by the cooperation between the rotating electrical machine 12 and the internal combustion engine 11 when the second shift mode is selected, the second engagement device CL2 is also included as the primary assisting component Sa in addition to the internal combustion engine 11. However, embodiments of the present invention are not limited to this. For example, even in such a case, only the internal combustion engine 11 may serve as the primary assisting component Sa. That is, the second engagement device CL2 may not be included as the primary assisting component Sa, and shift assist may be implemented in such a range of torque that can be output by the cooperation between the rotating electrical machine 12 and the internal combustion engine 11. In this manner, reduction in downshift response may be permitted to some degree to prioritize suppression of shift shock.

(4) The above embodiment is described with respect to the configuration in which selection of a shift mode by the driver or output of a shift command in the manual shift mode is performed based on the shift lever operation. However, embodiments of the present invention are not limited to this. For example, selection of a shift mode by the driver or output of a shift command in the manual shift mode may be performed based on the input operation to a button etc. that is provided as hardware or software. That is, any configuration may be used as long as the driver's intention of shifting or selection can be input to the control device 3. The same applies to selection of a drive mode etc.

(5) The above embodiment is described with respect to an example in which the drive device 1 that is controlled by the control device 3 has the configuration shown in FIG. 1. However, embodiments of the present invention are not limited to this. The drive device 1 may have any specific configuration as long as the rotating electrical machine 12 and the speed change mechanism 13 are provided in this order from the internal combustion engine 11 side on the power transmission path connecting the internal combustion engine 11 and the wheels 15. For example, the drive device 1 may include between the internal combustion engine 11 and the rotating electrical machine 12 a disconnecting engagement device that selectively drivingly couples the internal combustion engine 11 and the rotating electrical machine 12. The drive device 1 may include between the rotating electrical machine 12 and the speed change mechanism 13 a fluid coupling (e.g., a torque converter etc.) having a connecting engagement device. The drive device 1 may include a dedicated transmission engagement device at any position between the rotating electrical machine 12 and the differential gear unit 14.

(6) The above embodiment is described with respect to an example in which the speed change mechanism 13 is an automatic stepped speed change mechanism capable of switching between or among the plurality of shift speeds (capable of changing the speed ratio in stages). A speed change mechanism including a planetary gear mechanism and a hydraulic clutch, a so-called dual-clutch speed change mechanism, etc. may be used as this automatic stepped speed change mechanism. However, embodiments of the present invention are not limited to this. The speed change mechanism 13 may have any specific configuration as long as the speed change mechanism 13 is capable of changing the speed ratio by controlling the engagement state of the shift engagement devices included in the speed change mechanism 13. For example, the speed change mechanism 13 may be configured as an automatic stepless speed change mechanism with a clutch, etc.

(7) Regarding other configurations as well, the embodiments disclosed in the specification are by way of example only in all respects, and embodiments of the present invention are not limited to them. That is, those configurations which are not described in the claims of the present application may be modified as appropriate without departing from the object of the present invention.

Industrial Applicability

The present invention can be used for control devices that control a drive device for single-motor parallel hybrid vehicles.

Description of the Reference Numerals

1: Drive Device (Vehicle Drive Device)
3: Control Device
11: Internal Combustion Engine
12: Rotating Electrical Machine
13: Speed Change Mechanism
15: Wheel
32: Shift Mode Selecting Section (Mode Selecting Section)
41: Shift Assist Control Section
42: Possibility Determining Section
43: Torque Compensating Section
44: Primary assisting component Deciding Section
45: Allocation Deciding Section
I: Input Shaft (Input-Side Rotating Member)
CL1: First Engagement Device (Shift Engagement Device)
CL2: Second Engagement Device (Shift Engagement Device)
Ns: Synchronous Rotational Speed
Nsa: Pre-Shift Synchronous Rotational Speed
Nsb: Post-Shift Synchronous Rotational Speed
ΔNs: Difference between Pre-Shift Synchronous Rotational Speed and Post-Shift Synchronous Rotational Speed
At: Target Rotational Speed Change Rate
Ao: Lower Limit Rotational Speed Change Rate
Pt: Target Shift Time
Pu: Upper Limit Shift Time
Tn: Required Input Torque
To: Lower Limit Input Torque
Tam: Rotating Electrical Machine Assistable Torque
Tae: Internal Combustion Engine Assist Torque
Tac: Engagement Device Assist Torque
Qp: Acceptable Heat Generation Amount

The invention claimed is:

1. A control device for a vehicle drive device in which a rotating electrical machine and a speed change mechanism are provided in this order from an internal combustion engine side on a power transmission path connecting the internal combustion engine and wheels, and in which the speed change mechanism is capable of changing a speed ratio by controlling an engagement state of a shift engagement device included in the speed change mechanism, the control device comprising:

a shift assist control section that, in downshift in which the speed ratio is changed to a higher speed ratio, executes shift assist control of increasing a rotational speed of an input-side rotating member of the speed change mechanism by increasing torque of the rotating electrical machine which is transferred to the input-side rotating member;

a possibility determining section that determines whether or not the rotating electrical machine can output required input torque for increasing the rotational speed of the input-side rotating member according to a predetermined target rotational speed change rate;

a mode selecting section that selects one shift mode from a first shift mode and a second shift mode that is different from the first shift mode in at least one of a condition for starting the downshift and processing; and a torque compensating section that, if it is determined that the rotating electrical machine cannot output the required input torque, compensates for a shortfall in the required input torque in the shift assist control by using at least one of output torque of the internal combustion engine and torque that is transferred by the shift engagement device according to the shift mode.

2. The control device according to claim 1, wherein the first shift mode is an automatic shift mode, and the second shift mode is a manual shift mode, or the second shift mode is a mode in which time required for control for the downshift is shorter than that in the first shift mode or a mode in which acceleration response in the downshift is higher than that in the first shift mode, and the torque compensating section compensates for the shortfall by using the torque that is transferred by the shift engagement device when the first shift mode is selected, and compensates for the shortfall by using at least the output torque of the internal combustion engine when the second shift mode is selected.

3. The control device according to claim 2, wherein the possibility determining section further determines whether or not the rotating electrical machine can output lower limit input torque for increasing the rotational speed of the input-side rotating member according to a predetermined lower limit rotational speed change rate, and the torque compensating section compensates for the shortfall by using the torque that is transferred by the shift engagement device, on condition that it is determined that the rotating electrical machine cannot output the lower limit input torque when the first shift mode is selected.

4. The control device according to claim 3, wherein the rotational speed of the input-side rotating member which is determined according to a vehicle speed and the speed ratio is a synchronous rotational speed, and the lower limit rotational speed change rate is set based on a difference between synchronous rotational speeds before and after changing the speed ratio, and upper limit shift time determined so that a heat generation amount of the shift engagement device that is caused to slip when the speed ratio is changed is equal to or smaller than a predetermined acceptable heat generation amount.

5. The control device according to claim 2, wherein
the possibility determining section further determines whether or not the rotating electrical machine and the internal combustion engine can cooperatively output the required input torque, and
the torque compensating section compensates for the shortfall by further using the torque that is transferred by the shift engagement device, if it is determined that the required input torque cannot be output even by the cooperation between the rotating electrical machine and the internal combustion engine when the second shift mode is selected.

6. The control device according to claim 5, wherein
the possibility determining section further determines whether or not the rotating electrical machine can output lower limit input torque for increasing the rotational speed of the input-side rotating member according to a predetermined lower limit rotational speed change rate, and
the torque compensating section compensates for the shortfall by using the torque that is transferred by the shift engagement device, on condition that it is determined that the rotating electrical machine cannot output the lower limit input torque when the first shift mode is selected.

7. The control device according to claim 6, wherein
the rotational speed of the input-side rotating member which is determined according to a vehicle speed and the speed ratio is a synchronous rotational speed, and
the lower limit rotational speed change rate is set based on a difference between synchronous rotational speeds before and after changing the speed ratio, and upper limit shift time determined so that a heat generation amount of the shift engagement device that is caused to slip when the speed ratio is changed is equal to or smaller than a predetermined acceptable heat generation amount.

8. The control device according to claim 1, wherein
the torque compensating section executes control of compensating for the shortfall during execution of the shift assist control in power-off downshift if it is determined that the rotating electrical machine cannot output the required input torque.

* * * * *